(12) United States Patent
Cao

(10) Patent No.: US 11,405,146 B2
(45) Date of Patent: Aug. 2, 2022

(54) USER EQUIPMENT, ELECTRONIC DEVICE, WIRELESS COMMUNICATION METHOD, AND STORAGE MEDIUM

(71) Applicant: Sony Corporation, Tokyo (JP)

(72) Inventor: Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 57 days.

(21) Appl. No.: 16/964,210

(22) PCT Filed: Apr. 19, 2019

(86) PCT No.: PCT/CN2019/083395
§ 371 (c)(1),
(2) Date: Jul. 23, 2020

(87) PCT Pub. No.: WO2019/206031
PCT Pub. Date: Oct. 31, 2019

(65) Prior Publication Data
US 2021/0044388 A1 Feb. 11, 2021

(30) Foreign Application Priority Data
Apr. 27, 2018 (CN) .......................... 201810393956.0

(51) Int. Cl.
*H04L 1/18* (2006.01)
*H04L 5/00* (2006.01)
(Continued)

(52) U.S. Cl.
CPC .......... *H04L 1/1819* (2013.01); *H04L 5/0055* (2013.01); *H04L 5/0092* (2013.01);
(Continued)

(58) Field of Classification Search
CPC ... H04L 1/1896; H04L 1/1819; H04L 5/0055; H04L 5/0092; H04L 27/14; H04W 72/042; H04W 72/0453
See application file for complete search history.

(56) References Cited

U.S. PATENT DOCUMENTS

2015/0326354 A1* 11/2015 Li ....................... H04W 52/262
370/329
2017/0289981 A1* 10/2017 Kim ..................... H04L 1/1614
2018/0279304 A1* 9/2018 Lee ..................... H04W 72/042

FOREIGN PATENT DOCUMENTS

CN 103297205 A 9/2013
CN 103312473 A 9/2013
(Continued)

OTHER PUBLICATIONS

International Search Report and Written Opinion dated Jul. 18, 2019 for PCT/CN2019/083395 filed on Apr. 19, 2019, 8 pages including English Translation of the International Search Report.

*Primary Examiner* — Shukri Taha
(74) *Attorney, Agent, or Firm* — Xsensus, LLP

(57) ABSTRACT

The present invention relates to a user equipment, an electronic device, a wireless communication method, and a storage medium. The user equipment according to the present invention comprises a processing circuit configured to: demodulate a downlink signal from a network side device to obtain a Physical Downlink Control Channel (PDCCH) comprised in the downlink signal; and determine, according to the content of Downlink Control Information (DCI) born on the PDCCH, whether to implement Hybrid Automatic Repeat Request (HARD) feedback for the DCI. The use of the user equipment, the electronic device, the wireless communication method, and a computer readable storage medium according to the present invention can improve the reliability of control information born on a PDCCH.

13 Claims, 21 Drawing Sheets

(51) Int. Cl.
*H04L 27/14* (2006.01)
*H04W 72/04* (2009.01)

(52) U.S. Cl.
CPC ........... *H04L 27/14* (2013.01); *H04W 72/042* (2013.01); *H04W 72/0453* (2013.01)

(56) References Cited

FOREIGN PATENT DOCUMENTS

| | | |
|---|---|---|
| CN | 104010368 A | 8/2014 |
| CN | 106537979 A | 3/2017 |
| WO | 2014/110790 A1 | 7/2014 |

* cited by examiner

USER EQUIPMENT, ELECTRONIC DEVICE, WIRELESS COMMUNICATION METHOD, AND STORAGE MEDIUM

CROSS-REFERENCE TO RELATED APPLICATIONS

The present application is based on PCT filing PCT/CN2019/083395, filed Apr. 19, 2019, which claims priority to Chinese Patent Application No. 201810393956.0, filed Apr. 27, 2018 with the Chinese Patent Office, each of which is incorporated herein by reference in its entirety.

FIELD

The present disclosure generally relates to the technical field of wireless communications, and in particular to a user equipment and an electronic device in a wireless communication system, a wireless communication method, and a computer-readable storage medium. More particularly, the present disclosure relates to a user equipment in a wireless communication device, an electronic device serving as a network side device in a wireless communication system, a wireless communication method performed by auser equipment in a wireless communication system, a wireless communication method performed by a network side device in a wireless communication system, and a computer-readable storage medium.

BACKGROUND

With the hybrid automatic repeat request (HARQ) technology, the influence of time-varying characteristics and multipath fading of a wireless mobile channel on signal transmission can be compensated significantly. In a case of decoding failure, a receiver using the HARQ technology saves received data and requests a transmitter to retransmit data. The receiver combines the retransmitted data with the previously received data before decoding, thereby achieving certain diversity gain, reducing the number of times for retransmission, thus reducing latency and improving the reliability of data transmission.

In the conventional HARQ technology, the receiver mainly feeds back for data information, to improve the reliability of data information transmission. Since control information transmitted by high-level signaling, such as RRC (Radio Resource Control) layer signaling and Media Access Control (MAC) layer signaling, such as MAC CE, is carried by the physical downlink share channel (PDSCH) as data, the HARQ technology may also be applied. Currently, the application of the HARQ mechanism to control information carried by the physical downlink control channel (PDCCH) has not been discussed. It is well known that, the control information carried by the PDCCH is very important for the user equipment. If the user equipment cannot successfully obtain the control information carried by the PDCCH, the demodulation of the downlink data information and the transmission of the uplink data information may be affected.

Therefore, it is required to propose a technical solution to provide a HARQ feedback mechanism for the control information carried by the PDCCH, thereby improving the reliability of the control information carried by the PDCCH.

SUMMARY

This summary section provides a general summary of the present disclosure, rather than a comprehensive disclosure of its full scope or its features.

An object of the present disclosure is to provide a user equipment, an electronic device, a wireless communication method, and a computer-readable storage medium, to improve the reliability of control information carried by the PDCCH.

According to an aspect of the present disclosure, a user equipment is provided, which includes processing circuitry configured to: demodulate a downlink signal from a network side device to obtain a Physical Downlink Control Channel PDCCH contained in the downlink signal; and determine, according to content of Downlink Control Information DCI carried by the PDCCH, whether to perform a Hybrid Automatic Repeat Request HARQ feedback with respect to the DCI.

According to another aspect of the present disclosure, an electronic device is provided, which serves as a network side device. The electronic includes processing circuitry configured to: transmit a downlink signal containing a physical downlink control channel PDCCH to a user equipment; and determine, according to content of downlink control information DCI carried by the PDCCH, whether to receive, from the user equipment a hybrid automatic repeat request HARQ feedback message with respect to the DCI.

According to another aspect of the present disclosure, a user equipment is provided, which includes processing circuitry configured to: receive, from a network side device, first data information, second data information, first control information with respect to the first data information, and second control information with respect to the second data information, where the first data information includes the second control information, and the second data information includes the first control information; and decode information received from the network side device to obtain the first data information and the second data information.

According to another aspect of the present disclosure, an electronic device is provided, which serves as a network side device. The electronic device includes processing circuitry configured to: transmit, to a user equipment, first data information, second data information, first control information with respect to the first data information, and second control information with respect to the second data information, where the first data information includes the second control information, and the second data information includes the first control information.

According to another aspect of the present disclosure, an electronic device is provided, which serves as a network side device. The electronic device includes processing circuitry configured to: receive second control information with respect to second data information from other network side device than the electronic device; transmit first control information with respect to first data information to the other network side device, for the other network side device to include the first control information into the second data information; and transmit the first data information and the first control information to the user equipment, where the first data information includes the second control information. The first data information is downlink data information transmitted by the electronic device to the user equipment, and the second data information is downlink data information transmitted by the other network side device to the user equipment.

According to another aspect of the present disclosure, a wireless communication method performed by a user equipment is provided, which includes: demodulating a downlink signal from a network side device to obtain a Physical Downlink Control Channel PDCCH contained in the downlink signal; and determining, according to content of Downlink Control Information DCI carried by the PDCCH, whether to perform a Hybrid Automatic Repeat Request HARQ feedback with respect to the DCI.

According to another aspect of the present disclosure, a wireless communication method performed by a network side device is provided, which includes: transmitting a downlink signal containing a physical downlink control channel PDCCH to a user equipment; and determining, according to content of downlink control information DCI carried by the PDCCH, whether to receive, from the user equipment a hybrid automatic repeat request HARQ feedback message with respect to the DCI.

According to another aspect of the present disclosure, a wireless communication method performed by a network side device is provided, which includes: receiving second control information with respect to second data information from other network side device than the network side device; transmitting first control information with respect to first data information to the other network side device, for the other network side device to include the first control information into the second data information; and transmitting the first data information and the first control information to the user equipment, where the first data information includes the second control information. The first data information is downlink data information transmitted by the network side device to the user equipment, and the second data information is downlink data information transmitted by the other network side device to the user equipment.

According to another aspect of the present disclosure, a computer-readable storage medium is provided, which includes executable computer instructions. The executable computer instructions, when executed by a computer, cause the computer to perform the wireless communication method according to the present disclosure.

With the user equipment, the electronic device, the wireless communication method, and the computer-readable storage medium according to the present disclosure, the user equipment may determine, according to content of DCI carried by the PDCCH, whether to perform a HARQ feedback with respect to the DCI, and the network side device may determine, according to the content of the DCI, whether to receive a HARQ feedback message with respect to the DCI from the user equipment, thereby implementing the application of the HARQ feedback mechanism on the PDCCH, thus improving the transmission reliability of the DCI carried by the PDCCH.

With the user equipment, the electronic device, the wireless communication method, and the computer-readable storage medium according to the present disclosure, the network side device may transmit the first data information, the second data information, the first control information with respect to the first data information, and second control information with respect to the second data information to the user equipment, where the first data information includes the second control information, and the second data information includes the first control information, so that the user equipment may obtain the first data information and the second data information according to the information received from the network side device. In this way, the first control information and the second control information are transmitted twice, thereby achieving diversity gain, thus further improving the transmission reliability of the PDCCH.

From the description provided herein, further applicability areas will become apparent. The description and specific examples in this summary are for illustrative purposes only, and are not intended to limit the scope of the present disclosure.

BRIEF DESCRIPTION OF THE DRAWINGS

The drawings described herein are for illustrative purposes only of preferred embodiments rather than all possible embodiments, and are not intended to limit the scope of the present disclosure. In the drawings:

FIG. 31 (b) is a flowchart showing a wireless communication method performed by an electronic device serving as a network side device according to an embodiment of the present disclosure;

Figure 1:
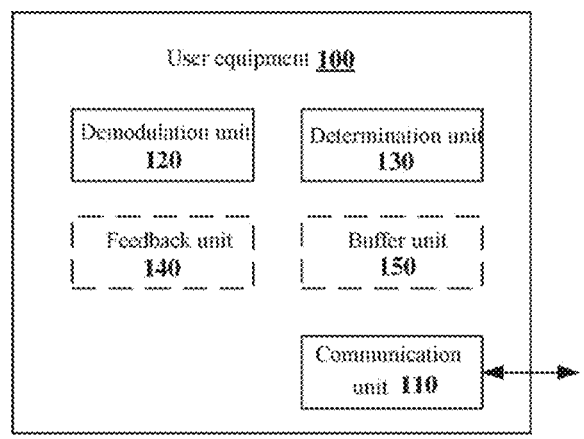
FIG. 1 is a block diagram showing an example of a configuration of a user equipment according to an embodiment of the present disclosure.

Although the present disclosure is susceptible to various modifications and alternative forms, specific embodiments thereof have been shown in the drawings as examples and are described in detail herein. However, it should be understood that the description of specific embodiments herein is not intended to limit the present disclosure to the disclosed specific forms, on the contrary, the purpose of the present disclosure is to cover all modifications, equivalences and replacements that fall within the spirit and scope of the present disclosure. It should be noted that throughout the several drawings, corresponding reference numerals indicate corresponding parts.

DETAILED DESCRIPTION OF EMBODIMENTS

Examples of the present disclosure are described more fully with reference to the drawings. The following description is merely exemplary, and is not intended to limit the present disclosure, application, or use.

Example embodiments are provided so that the present disclosure will be thorough and fully convey the scope to those skilled in the art. Numerous specific details such as examples of specific components, devices, and methods are set forth to provide a thorough understanding of the embodiments of the present disclosure. It will be apparent to those skilled in the art that the example embodiments may be implemented in many different forms without using specific details, none of which should be construed as limiting the scope of the present disclosure. In some example embodiments, well-known processes, well-known structures, and well-known technologies are not described in detail.

The description will be made in the following order:
1. Description of a scenario;
2. Configuration example of a user equipment that performs a HARQ feedback with respect to a PDCCH;
3. Configuration example of a user equipment that backs-up a PDCCH;
4. Configuration example of a network side device that performs a HARQ feedback with respect to a PDCCH;
5. Configuration example of a network side device that backs-up a PDCCH;
6. Method embodiments;
7. Application examples.

1. Description of a Scenario

A network side device may transmit DCI to a user equipment within its coverage through a PDCCH. The user equipment may obtain control information by demodulating the DCI carried by the PDCCH, so as to perform subsequent operations, such as operations of demodulating downlink data information and transmitting uplink data information.

In the New Radio (NR) communication system, formats of the DCI carried by the PDCCH include DCI format 0, DCI format 1 and DCI format 2. The DCI format 0 represents control information related to uplink transmission between the user equipment and the network side device, such as control information related to the Physical Uplink Share Channel (PUSCH) transmission and control information related to reporting triggering of the Channel State Information (CSI), which mainly includes DCI format 0_0 and DCI format 0_1. The DCI format 1 represents control information related to downlink transmission between the user equipment and the network side device, such as the control information related to the PDSCH transmission, which mainly includes DCI format 1_0 and DCI format 1_1. The DCI format 2 represents control information other than the DCI format 0 and the DCI format 1, such as control information related to Group Common-Physical Downlink Control Channel (GC-PDCCH) and power control, which mainly includes DCI Format 2_0, DCI format 2_1, DCI format 2_2, and DCI format 2_3.

A user equipment, an electronic device serving as a network side device in a wireless communication system, a wireless communication method performed by a network side device in a wireless communication system, and a wireless communication method performed by a user equipment in a wireless communication system, and a computer-readable storage medium are provided according to the present disclosure, to improve the transmission reliability of DCI carried by the PDCCH.

The wireless communication system according to the present disclosure may be a 5G NR communication system. In the NR communication system, the Ultra Reliable & Low Latency Communication (URLLC) service has a requirement on an error probability of less than $10^{-5}$ for the control channel, which is more stringent than services of other types. With the device and the method according to the present disclosure, the transmission reliability of the PDCCH of the URLLC service can be ensured.

The network side device according to the present disclosure may be any type of Transmit and Receive Port (TRP). The TRP may have transmitting and receiving functions, for example, the TRP may receive information from the user equipment and a base station device, and may also transmit information to the user equipment and the base station device. In an example, the TRP may provide services for the user equipment and is controlled by the base station device. That is, the base station device provides services to the user equipment through the TRP. In addition, the network side device described in the present disclosure may also be a base station device, such as an eNB or gNB (a base station in a fifth-generation communication system).

The user equipment according to the present disclosure may be a mobile terminal (such as a smart phone, a tablet personal computer (PC), a notebook PC, a portable game terminal, a portable/dongle-type mobile router, and a digital camera) or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the above terminals.

2. Configuration Example of a User Equipment that Performs a HARQ Feedback with Respect to a PDCCH FIG. 1 is a block diagram showing an example of a configuration of a user equipment 100 according to an embodiment of the present disclosure. The electronic device 100 here may serve as a user equipment in a wireless communication system.

As shown in FIG. 1, the user equipment 100 may include a communication unit 110, a demodulation unit 120, and a determination unit 130.

Here, each unit of the user equipment 100 may be included in a processing circuit. It should be noted that the user equipment 100 may include one processing circuit or multiple processing circuits. Further, the processing circuit may include various discrete functional units to perform various functions and/or operations. It should be noted that these functional units may be physical entities or logical entities, and units with different names may be implemented by the same physical entity.

According to an embodiment of the present disclosure, the communication unit 110 may receive a downlink signal from the network side device. Here, the network side device may provide service to the user equipment 100, so that the user equipment 100 may receive a downlink signal from the network side device.

According to an embodiment of the present disclosure, the demodulation unit 120 may demodulate the downlink signal from the network side device to obtain a PDCCH contained therein. Further, the downlink signal may include DCI carried by the PDCCH.

According to an embodiment of the present disclosure, the determination unit 130 may determine whether to perform a HARQ feedback with respect to the DCI according to content of the DCI carried by the PDCCH.

As described above, the user equipment 100 according to the embodiment of the present disclosure may determine whether to perform a HARQ feedback with respect to the DCI according to the content of the DCI carried by the PDCCH, thereby realizing the application of the HARQ feedback mechanism on the PDCCH, thus improving the transmission reliability of the DCI carried by the PDCCH.

According to an embodiment of the present disclosure, the determination unit 130 may determine whether to perform the HARQ feedback with respect to the DCI according to whether the DCI carried by the PDCCH includes control information related to uplink transmission or control information related to downlink transmission.

According to an embodiment of the present disclosure, the determination unit 130 may determine whether the DCI includes control information related to uplink transmission or includes control information related to downlink transmission according to the format of the DCI carried by the PDCCH. As described above, in a case that the DCI has a format of DCI format 0, the determination unit 130 may determine that the DCI includes control information related to uplink transmission, and in a case that the DCI has a format of DCI format 1, the determination unit 130 may determine that the DCI includes control information related to downlink transmission.

According to an embodiment of the present disclosure, in a case that the determination unit 130 determines that the DCI includes control information related to downlink transmission, the determination unit 130 may determine to perform the HARQ feedback with respect to the DCI. Here, in a case that the DCI includes control information related to downlink transmission, the DCI may adopt the DCI format 1.

According to an embodiment of the present disclosure, in a case that the determination unit 130 determines that the DCI includes control information related to uplink transmission, the determination unit 130 may determine not to perform the HARQ feedback with respect to the DCI. Here, in a case that the DCI includes control information related to uplink transmission, the DCI may adopt the DCI format 0.

According to an embodiment of the present disclosure, in a case that the DCI includes control information related to uplink transmission, the user equipment 100 may implicitly feed back to the network side device whether to correctly decode the DCI. For example, in a case that the DCI includes a CSI report request, that is, the user equipment 100 is requested to report CSI to the network side device, the network side device may determine whether the user equipment 100 correctly decodes the DCI based on the received CSI report. As another example, in a case that the DCI includes control information related to transmission of a PUSCH, that is, the user equipment 100 is requested to transmit uplink data to the network side device through the PUSCH, the network side device may determine whether the user equipment correctly decodes the DCI by detecting whether there is a PUSCH on the uplink resource indicated by the DCI. That is, in a case that the DCI includes control information related to uplink transmission, the user equipment 100 may implicitly feed back to the network side device whether the DCI is correctly decoded through operations related to the DCI. This implicit feedback manner can also improve the transmission reliability of DCI related to uplink transmission. In this case, according to an embodiment of the present disclosure, the user equipment 100 does not perform the HARQ feedback with respect to the DCI. In this way, signaling overhead is saved, and latency is reduced.

As described above, according to an embodiment of the present disclosure, the user equipment 100 may determine whether to perform the HARQ feedback according to the content of the DCI, and only perform the HARQ feedback if the DCI includes control information related to downlink transmission, thereby saving overheads while improving the transmission reliability.

According to an embodiment of the present disclosure, the demodulation unit 120 may demodulate and decode the DCI.

Further, as shown in FIG. 1, the user equipment 100 may further include a feedback unit 140 configured to generate feedback information in a case that it is required to perform HARQ feedback with respect to DCI carried by a PDCCH. The feedback information here may include an ACK message and a NACK message.

According to an embodiment of the present disclosure, in a case that the DCI is correctly decoded, the feedback unit 140 may generate an ACK message with respect to the DCI and transmit the ACK message with respect to the DCI to the network side device. Further, in this case, the user equipment 100 may also receive downlink data from the network side device according to the correctly decoded DCI.

Figure 2:
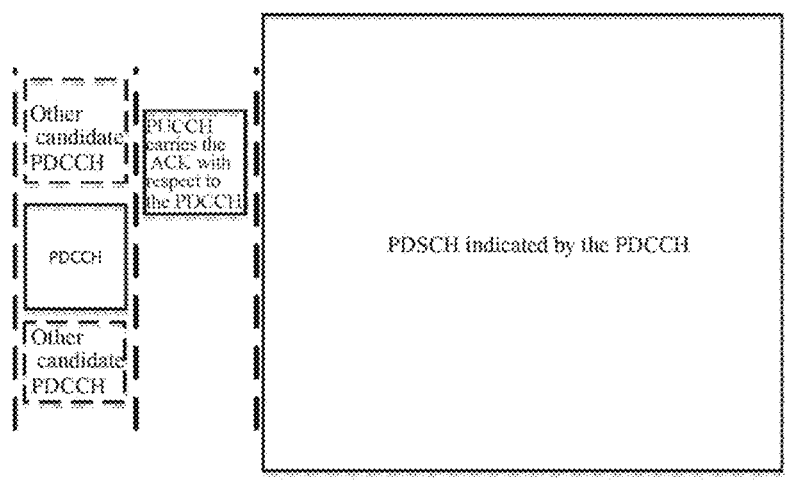
FIG. 2 is a schematic diagram showing a process of performing a HARQ feedback with respect to a PDCCH according to an embodiment of the present disclosure.

FIG. 2 is a schematic diagram showing a process of performing a HARQ feedback with respect to a PDCCH according to an embodiment of the present disclosure. Specifically, FIG. 2 is a schematic diagram showing a case that the DCI carried by the PDCCH is correctly decoded. In FIG. 2, the horizontal direction represents a time domain, and the vertical direction represents a frequency domain. As shown in FIG. 2, first, the network side device selects time frequency resources (which occupy one or more OFDM symbols in the time domain and occupy one or more subcarriers in the frequency domain) and transmits a PDCCH to the user equipment by using the selected time frequency resources. Next, the user equipment transmits an ACK message with respect to the PDCCH to the network side device. Here, the user equipment may carry the ACK message with respect to the PDCCH by using a Physical Uplink Control Channel (PUCCH). Next, after receiving the ACK message with respect to the PDCCH, the network side device transmits downlink data information to the user equipment by using the PDSCH indicated in the PDCCH. Herein, since PDCCH carries DCI, there is no specific distinction between the PDCCH and the DCI, thus the ACK message with respect to the PDCCH refers to the ACK message with respect to the DCI carried by the PDCCH.

Figure 3:
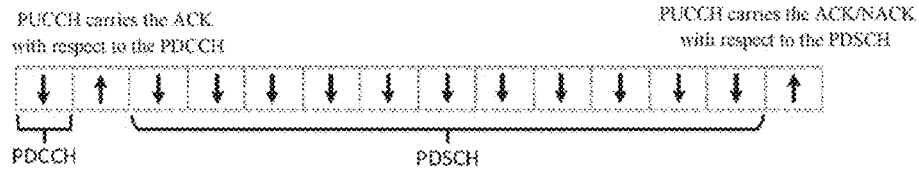
FIG. 3 is a schematic diagram showing a configuration of a time slot in the embodiment shown in FIG. 2.

FIG. 3 is a schematic diagram showing a configuration of a time slot in the embodiment shown in FIG. 2. FIG. 3 is a schematic diagram showing a configuration of a time slot including 14 OFDM symbols. As shown in FIG. 3, a first OFDM symbol of the time slot is used for downlink transmission, and the network side device transmits a PDCCH to the user equipment; a second OFDM symbol of the time slot is used for uplink transmission, and the user equipment transmits a PUCCH to the network side device, which carries an ACK message with respect to the PDCCH; a third to a thirteenth OFDM symbols of the time slot are used for downlink transmission, and the network side device transmits PDSCH to the user equipment; a fourteenth OFDM symbol of the time slot is used for uplink transmission, and the user equipment transmits a HARQ feedback message with respect to the PDSCH to the network side device. It is noted that FIG. 3 only shows an exemplary configuration of the time slot. For example, although FIG. 3 shows a case that the PDCCH occupies one OFDM symbol, the PDCCH may also occupy two or three OFDM symbols. In addition, the PDSCH may also occupy other numbers of OFDM symbols.

As described above, according to an embodiment of the present disclosure, in the case that the DCI is correctly decoded, the user equipment 100 may generate an ACK message with respect to the DCI, so that the network side device may transmit downlink data to the user equipment 100 according to the ACK message.

According to an embodiment of the present disclosure, in a case that the DCI is not correctly decoded, the feedback unit 140 may generate a NACK message with respect to the DCI and transmit the NACK message with respect to the DCI to the network side device. Further, in this case, after transmitting the NACK message, the user equipment 100 may receive retransmitted DCI from the network side device.

Figure 4:
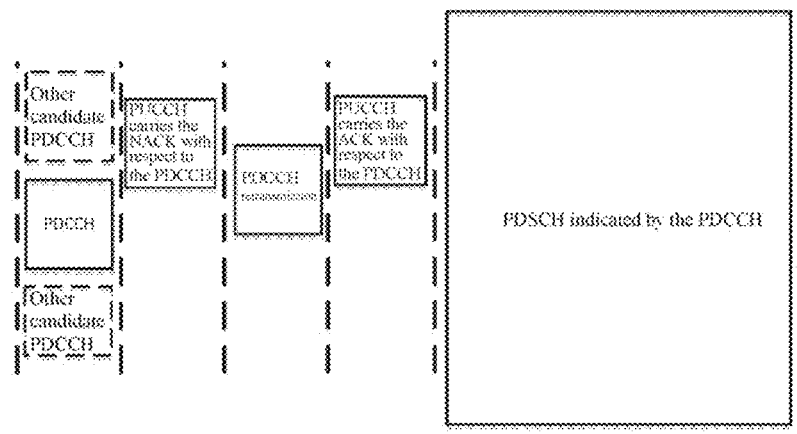
FIG. 4 is a schematic diagram showing a process of performing a HARQ feedback with respect to a PDCCH according to an embodiment of the present disclosure.

FIG. 4 is a schematic diagram showing a process of performing a HARQ feedback with respect to a PDCCH according to an embodiment of the present disclosure. Specifically, FIG. 4 is a schematic diagram showing a case that the DCI carried by the PDCCH is not correctly decoded. In FIG. 4, the horizontal direction represents a time domain, and the vertical direction represents a frequency domain. As shown in FIG. 4, first, the network side device selects time frequency resources (which occupy one or more OFDM symbols in the time domain and occupy one or more subcarriers in the frequency domain) and transmits the PDCCH to the user equipment by using selected time frequency resources. Next, the user equipment transmits a NACK message with respect to the PDCCH to the network side device. Here, the user equipment may carry the NACK message with respect to the PDCCH by using the PUCCH. Next, after receiving the NACK message with respect to the PDCCH, the network side device retransmits the PDCCH to the user equipment. Next, the user equipment decodes the retransmitted PDCCH, and transmits an ACK message with respect to the PDCCH to the network side device by using the PUCCH. Next, after receiving the ACK message with respect to the PDCCH, the network side device transmits the downlink data information to the user equipment by using a PDSCH indicated in the PDCCH.

Figure 5:
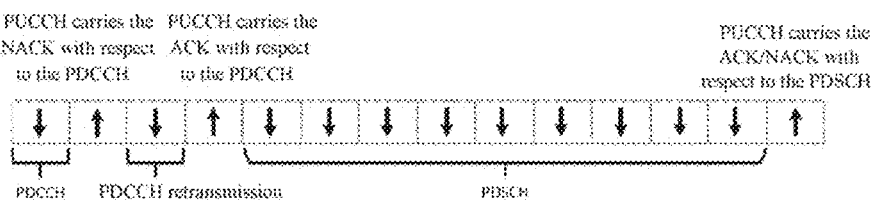
FIG. 5 is a schematic diagram showing a configuration of a time slot in the embodiment shown in FIG. 4.

FIG. 5 is a schematic diagram showing a configuration of a time slot in the embodiment shown in FIG. 4. FIG. 5 is a schematic diagram showing a configuration of a time slot including 14 OFDM symbols. As shown in FIG. 5, a first OFDM symbol of the time slot is used for downlink transmission, and the network side device transmits a PDCCH to the user equipment; a second OFDM symbol of the time slot is used for uplink transmission, and the user equipment transmits a PUCCH to the network side device, which carries a NACK message with respect to the PDCCH; a third OFDM symbol of the time slot is used for downlink transmission, and the network side device retransmits the PDCCH to the user equipment; a fourth OFDM symbol of the time slot is used for uplink transmission, and the user equipment transmits a PUCCH to the network side device, which carries the ACK message with respect to the PDCCH; a fifth to thirteenth OFDM symbols of the time slot are used for downlink transmission, and the network side device transmits a PDSCH to the user equipment; a fourteenth OFDM symbol of the time slot is used for uplink transmission, and the user equipment transmits a HARQ feedback message with respect to the PDSCH to the network side device. It is noted that FIG. 5 only shows an exemplary configuration of the time slot. For example, although FIG. 5 shows a case that the PDCCH occupies one OFDM symbol, the PDCCH may also occupy two or three OFDM symbols. In addition, the PDSCH may also occupy other numbers of OFDM symbols.

In the embodiments shown in FIGS. 4 and 5, after one retransmission of the PDCCH, the user equipment correctly decodes the DCI carried by the PDCCH. However, it is also possible that the user equipment can correctly decode the DCI carried by the PDCCH only after two or more retransmissions of the PDCCH. According to an embodiment of the present disclosure, each time the user equipment 100 transmits a NACK message with respect to the PDCCH to the network side device, the user equipment 100 may receive the retransmitted PDCCH from the network side device until the user equipment 100 correctly decodes the DCI carried by the PDCCH, then the user equipment 100 receives downlink data from the network side device. That is, the retransmission of the PDCCH between the network side device and the user equipment 100 may be performed one time or multiple times.

Further, according to an embodiment of the present disclosure, the number of retransmissions of the PDCCH may also be limited. In a case that the NACK message with respect to the DCI received from the user equipment exceeds a predetermined threshold for the number of retransmissions, the network side device may no longer retransmit the PDCCH, for example, the user equipment 100 is rescheduled.

As described above, according to an embodiment of the present disclosure, in the case that the DCI is not decoded correctly, the user equipment 100 may generate a NACK message with respect to the DCI, so that the network side device may retransmit the PDCCH to the user equipment 100 according to the NACK message, until the user equipment 100 correctly decodes the DCI. After the user equipment 100 correctly decodes the DCI, the network side device may transmit downlink data to the user equipment 100. In addition, a threshold may be set for the number of retransmissions of the PDCCH, to reduce latency.

According to an embodiment of the present disclosure, the communication unit 110 may simultaneously receive downlink data and the retransmitted DCI from the network side device by using different frequency domain resources. Here, in a case that the wireless communication system where the user equipment 100 and the network side device are located adopts a Frequency Division Duplex (FDD) mode, the retransmission of the PDCCH and the transmission of the PDSCH may be performed by using the same time domain resource and different frequency domain resources.

According to an embodiment of the present disclosure, in a case that the user equipment 100 receives the retransmitted DCI from the network side device, the user equipment 100 may decode the retransmitted DCI and transmits ACK/NACK message to the network side device according to a result of decoding on the DCI.

Figure 6:
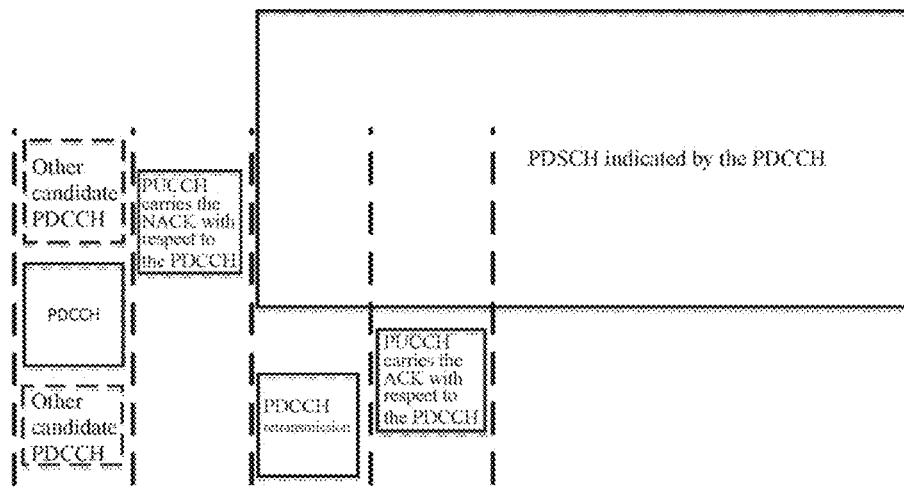
FIG. 6 is a schematic diagram showing a process of performing a HARQ feedback with respect to a PDCCH according to an embodiment of the present disclosure.

FIG. 6 is a schematic diagram showing a process of performing a HARQ feedback with respect to a PDCCH according to an embodiment of the present disclosure. Specifically, FIG. 6 is a schematic diagram showing a case of performing retransmission of a PDCCH and transmission of a PDSCH by using different frequency domain resources. In FIG. 6, the horizontal direction represents a time domain, and the vertical direction represents a frequency domain. As shown in FIG. 6, first, the network side device selects time frequency resources (which occupy one or more OFDM symbols in the time domain and occupy one or more subcarriers in the frequency domain) and transmits a PDCCH to the user equipment by using the selected time frequency resources. Next, the user equipment transmits a NACK message with respect to the PDCCH to the network side device. Here, the user equipment may carry the NACK message with respect to the PDCCH by using the PUCCH. Next, after receiving the NACK message with respect to the PDCCH, the network side device retransmits the PDCCH to the user equipment. In addition, the network side device transmits downlink data to the user equipment by using the PDSCH with different frequency domain resources. In the process of transmitting downlink data, the user equipment decodes the retransmitted PDCCH, and transmits the ACK message with respect to the PDCCH to the network side device by using the PUCCH.

According to an embodiment of the present disclosure, the user equipment 100 may receive the PDCCH retransmitted for multiple times from the network side device. Further, in this case, the user equipment may not transmit an ACK/NACK message with respect to the retransmitted PDCCH to the network side device.

Figure 7:
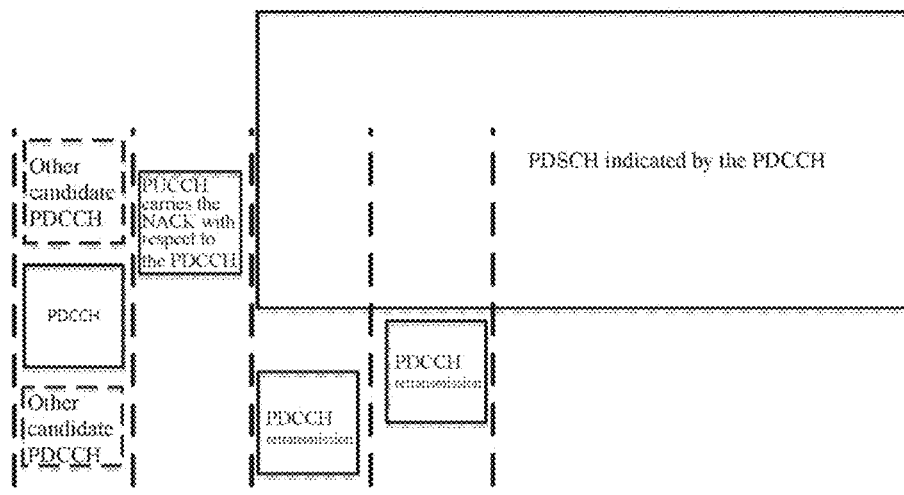
FIG. 7 is a schematic diagram showing a process of performing a HARQ feedback with respect to a PDCCH according to an embodiment of the present disclosure.

FIG. 7 is a schematic diagram showing a process of performing a HARQ feedback with respect to a PDCCH according to an embodiment of the present disclosure. Specifically, FIG. 7 is a schematic diagram showing a case of performing multiple retransmissions of the PDCCH and the transmission of a PDSCH by using different frequency domain resources. In FIG. 7, the horizontal direction represents a time domain, and the vertical direction represents a frequency domain. As shown in FIG. 7, first, the network side device selects time frequency resources (which occupy one or more OFDM symbols in the time domain and occupy one or more subcarriers in the frequency domain) and transmits the PDCCH to the user equipment by using the selected time frequency resources. Next, the user equipment transmits a NACK message with respect to the PDCCH to the network side device. Here, the user equipment may carry the NACK message with respect to the PDCCH by using the PUCCH. Next, after receiving the NACK message with respect to the PDCCH, the network side device retransmits the PDCCH to the user equipment for multiple times. In addition, the network side device transmits downlink data to the user equipment by using a PDSCH with different frequency domain resources. As shown in FIG. 7, the network side device retransmits the PDCCH twice to the user equipment, and the user equipment does not perform ACK/NACK feedback with respect to the retransmitted PDCCH. However, the network side device may also retransmit the PDCCH to the user equipment for three or more times.

As described above, the retransmission of the PDCCH and the transmission of the PDSCH may be performed by using the same time domain resource and different frequency-domain resources, thereby reducing latency. Further, in a case that the user equipment 100 does not correctly decode the DCI, the retransmitted PDCCH may be received from the network side device for multiple times, thereby improving the reliability of the PDCCH. In this case, since the PDCCH is retransmitted between the network side device and the user equipment 100 for multiple times, the possibility that the PDCCH is correctly decoded by the user equipment 100 is greatly increased, so that the user equipment 100 may not perform the ACK/NACK feedback with respect to the retransmitted PDCCH.

As described above, in a case that the determination unit 130 determines to perform the HARQ feedback with respect to DCI carried by the PDCCH, the feedback unit 140 may generate a feedback message and transmit the feedback message to the network side device. The feedback message here only includes an ACK/NACK message with respect to one DCI. Next, another embodiment of the feedback message is described.

According to an embodiment of the present disclosure, the HARQ feedback message transmitted by the user equipment 100 to the network side device may also be a combined HARQ feedback message. For example, the combined HARQ feedback message may include a HARQ feedback message with respect to DCI and a HARQ feedback message with respect to downlink data carried by a PDSCH. Here, the combined HARQ feedback message may include, for example, an ACK/NACK message with respect to the DCI and an ACK/NACK message with respect to the downlink data.

According to an embodiment of the present disclosure, the user equipment 100 may receive DCI carried by the PDCCH and downlink data carried by the PDSCH from the network side device, and combine a HARQ feedback message with respect to the DCI and a HARQ feedback message with respect to the downlink data, thereby saving signaling overhead and reducing latency.

Figure 8:
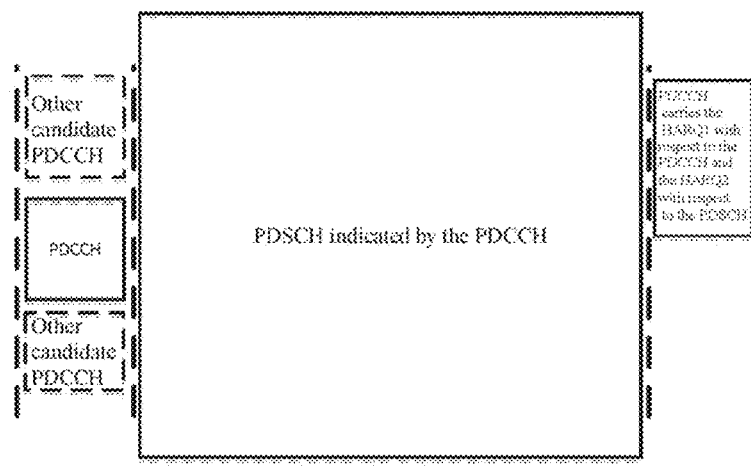
FIG. 8 is a schematic diagram showing a process of performing a HARQ feedback with respect to a PDCCH according to an embodiment of the present disclosure.

FIG. 8 is a schematic diagram showing a process of performing a HARQ feedback with respect to a PDCCH according to an embodiment of the present disclosure. FIG. 8 is a schematic diagram showing a case of combining a feedback message with respect to DCI carried by a PDCCH and a feedback message with respect to downlink data carried by a PDSCH. In FIG. 8, the horizontal direction represents a time domain, and the vertical direction represents a frequency domain. As shown in FIG. 8, first, the network side device selects time frequency resources (which occupy one or more OFDM symbols in the time domain and occupy one or more subcarriers in the frequency domain) and transmit DCI to the user equipment through the PDCCH by using the selected time frequency resources. Next, the network side device transmits downlink data to the user equipment through the PDSCH. Next, the user equipment decodes the DCI and downlink data, generates a feedback message with respect to the DCI and a feedback message with respect to the downlink data, combines the two feedback messages, and transmits the combined feedback message to the network side device. Here, the user equipment may carry the combined feedback message by using the PUCCH.

According to an embodiment of the present disclosure, the combined HARQ feedback message may include a HARQ feedback message with respect to the DCI and a HARQ feedback message with respect to one or more other DCIs. Here, the combined HARQ feedback message may include an ACK/NACK message with respect to each of multiple DCIs.

According to an embodiment of the present disclosure, the user equipment 100 may receive multiple DCIs carried by the PDCCH from the network side device, and combine HARQ feedback messages with respect to the multiple DCIs, thereby saving signaling overhead and reducing latency.

Figure 9:
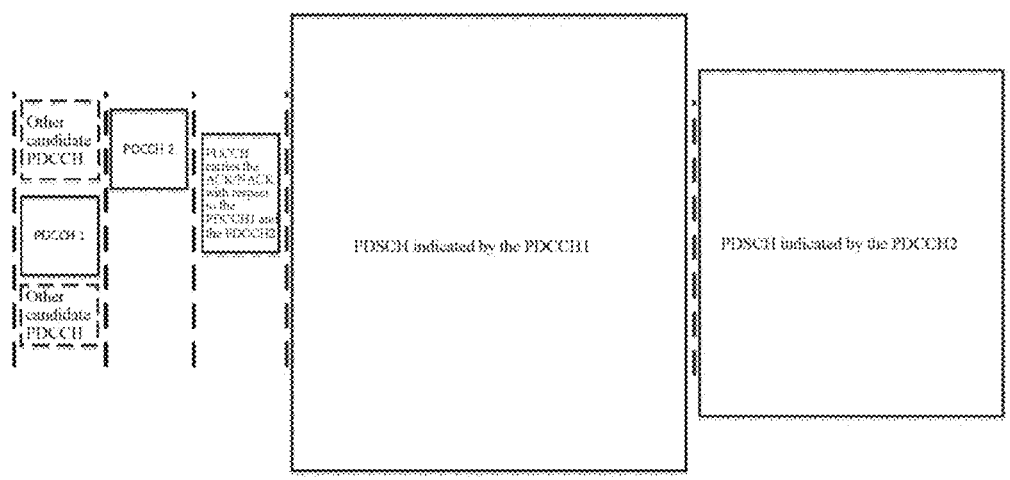
FIG. 9 is a schematic diagram showing a process of performing a HARQ feedback with respect to a PDCCH according to an embodiment of the present disclosure.

FIG. 9 is a schematic diagram showing a process of performing a HARQ feedback with respect to a PDCCH according to an embodiment of the present disclosure. FIG. 9 is a schematic diagram showing a case of combining feedback messages with respect to multiple DCIs carried by the PDCCH. In FIG. 9, the horizontal direction represents a time domain, and the vertical direction represents a frequency domain. As shown in FIG. 9, first, the network side device selects time frequency resources (which occupy one or more OFDM symbols in the time domain and occupy one or more subcarriers in the frequency domain) and transmit a first DCI (which labeled by PDCCH1 in FIG. 9) to the user equipment through the PDCCH by using the selected time-frequency resources. Next, the network side device selects time frequency resources and transmits a second DCI (which is labeled by PDCCH2 in FIG. 9) to the user equipment through the PDCCH by using the selected time frequency resources. Next, the user equipment decodes the first DCI and the second DCI, and generates a feedback message with respect to the first DCI and a feedback message with respect to the second DCI, and combines the two feedback messages and transmits the combined feedback message to the network side device. Here, the user equipment may carry the combined feedback message by using the PUCCH. In a case that the user equipment successfully decodes the first DCI and the second DCI, the network side device transmits the PDSCH indicated by the first DCI to the user equipment. Next, the network side device transmits the PDSCH indicated by the second DCI to the user equipment. FIG. 9 shows a situation in which the user equipment 100 combines feedback messages with respect to two DCIs. However, the user equipment 100 may also combine feedback messages with respect to three or more DCIs.

Figure 10:
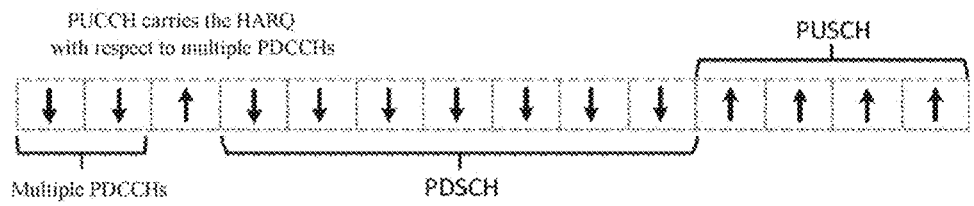
FIG. 10 is a schematic diagram showing a configuration of a time slot in the embodiment shown in FIG. 9.

FIG. 10 is a schematic diagram showing a configuration of a time slot in the embodiment shown in FIG. 9. FIG. 10 is a schematic diagram showing a configuration of a time slot including 14 OFDM symbols. As shown in FIG. 10, a first and second OFDM symbols of the time slot are used for downlink transmission, and the network side device transmits multiple PDCCHs to the user equipment; a third OFDM symbol of the time slot is used for uplink transmission, and the user equipment transmits a PUCCH to the network side device, which carries HARQ feedback messages with respect to multiple DCIs; a fourth to tenth OFDM symbols of the time slot are used for downlink transmission, and the network side device transmits a PDSCH to the user equipment; an eleventh to fourteenth OFDM symbols of the time slot are used for uplink transmission, and the user equipment transmits a PUSCH to the network side device. It is noted that FIG. 10 only shows an exemplary configuration of the time slot. For example, although FIG. 10 shows a case that the PDCCH occupies two OFDM symbols, the PDCCH may also occupy one or three OFDM symbols. In addition, the PDSCH and PUSCH may also occupy other numbers of OFDM symbols.

As described above, the feedback message transmitted by the user equipment 100 to the network side device may be a combined feedback message. The combined feedback message may include a feedback message with respect to the DCI and a feedback message with respect to the downlink data. The combined feedback message may also include feedback messages with respect to multiple DCIs. Further, the combined feedback message may also include feedback messages with respect to multiple DCIs and the feedback message with respect to downlink data. That is, the user equipment 100 may combine various HARQ feedback messages according to actual needs, thereby saving signaling overhead and reducing latency.

According to an embodiment of the present disclosure, the network side device may transmit downlink data through the PDSCH after the user equipment 100 correctly decodes the PDCCH, or may transmit the downlink data through the PDSCH before the user equipment 100 correctly decodes the PDCCH. In the latter case, the user equipment 100 may buffer the received downlink data and decode the downlink data after successfully decoding the PDCCH. This buffering manner may be referred to as soft buffering.

As shown in FIG. 1, according to an embodiment of the present disclosure, the user equipment 100 may further include a buffer unit 150 configured to buffer downlink data in a case of not correctly decoding the PDCCH.

According to an embodiment of the present disclosure, before receiving the retransmitted DCI from the network side device, the communication unit 110 may receive downlink data from the network side device, and the buffer unit 150 may buffer the received downlink data. Here, the user equipment 100 may receive the downlink data from the network side device through the PDSCH. In addition, after buffering the received downlink data, the user equipment 100 may receive the retransmitted DCI from the network side device, and demodulate the buffered downlink data by using the correctly decoded DCI.

According to an embodiment of the present disclosure, after transmitting a NACK message with respect to the PDCCH to the network side device and before receiving the retransmitted DCI from the network side device, the communication unit 110 may receive downlink data from the network side device, and the buffer unit 150 may buffer the received downlink data.

Figure 11:
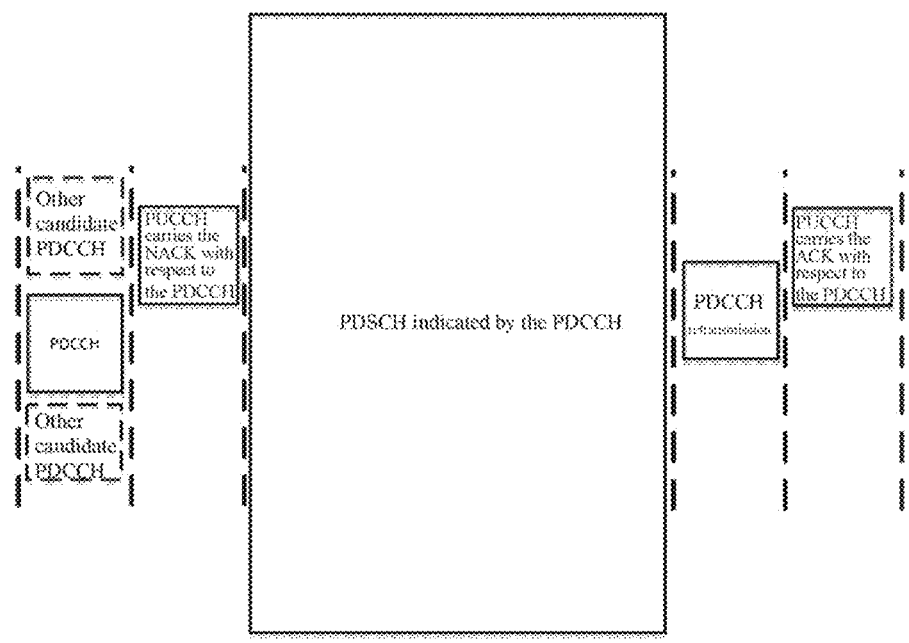
FIG. 11 is a schematic diagram showing a process of performing a HARQ feedback with respect to a PDCCH according to an embodiment of the present disclosure.

FIG. 11 is a schematic diagram showing a process of performing a HARQ feedback with respect to a PDCCH according to an embodiment of the present disclosure. Specifically, FIG. 11 is a schematic diagram showing a case of receiving downlink data from the network side device and buffering the received downlink data after transmitting a NACK message with respect to the PDCCH to the network side device. In FIG. 11, the horizontal direction represents a time domain, and the vertical direction represents a frequency domain. As shown in FIG. 11, first, the network side device selects time frequency resources (which occupy one or more OFDM symbols in the time domain and occupy one or more subcarriers in the frequency domain) and transmit DCI to the user equipment through the PDCCH by using the selected time frequency resources. Next, the user equipment decodes the DCI, and generates a NACK message with respect to the DCI and transmits the NACK message to the network side device. Here, the user equipment may carry the NACK message by using the PUCCH. Next, the network side device transmits the PDSCH indicated by DCI to the user equipment. The user equipment buffers the PDSCH. Next, the network side device retransmits the PDCCH to the user equipment. Next, the user equipment decodes the retransmitted PDCCH, generates an ACK message with respect to the PDCCH, and transmits the ACK message to the network side device. In addition, the user equipment may demodulate the buffered downlink data by using the correctly decoded PDCCH.

Figure 12:
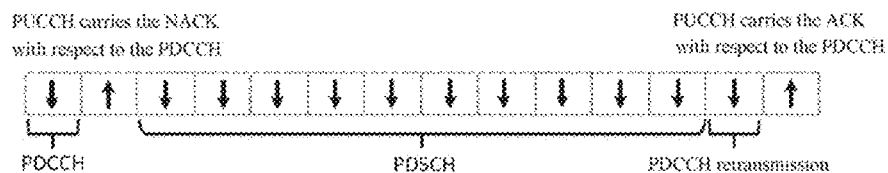
FIG. 12 is a schematic diagram showing a configuration of a time slot in the embodiment shown in FIG. 11.

FIG. 12 is a schematic diagram showing a configuration of a time slot in the embodiment shown in FIG. 11. FIG. 12 is a schematic diagram showing a configuration of a time slot including 14 OFDM symbols. As shown in FIG. 12, a first OFDM symbol of the time slot is used for downlink transmission, and the network side device transmits a PDCCH to the user equipment; a second OFDM symbol of the time slot is used for uplink transmission, and the user equipment transmits a PUCCH to the network side device, which carries a NACK message with respect to DCI; a third to twelfth OFDM symbols of the time slot are used for downlink transmission, and the network side device transmits a PDSCH to the user equipment; a thirteenth OFDM symbol of the time slot is used for downlink transmission, and the network side device retransmits the PDCCH to the user equipment; a fourteenth OFDM symbol of the time slot is used for uplink transmission, and the user equipment transmits a PUCCH to the network side device, which carries an ACK message with respect to the retransmitted DCI. It is noted that FIG. 12 only shows an exemplary configuration of the time slot. For example, although FIG. 12 shows a case that the PDCCH occupies one OFDM symbol, the PDCCH may also occupy two or three OFDM symbols. In addition, PDSCH may also occupy other numbers of OFDM symbols.

According to an embodiment of the present disclosure, before transmitting the NACK message with respect to the PDCCH to the network side device and before receiving the retransmitted DCI from the network side device, the communication unit 110 may receive downlink data from the network side device, and the buffer unit 150 may buffer the received downlink data.

Figure 13:
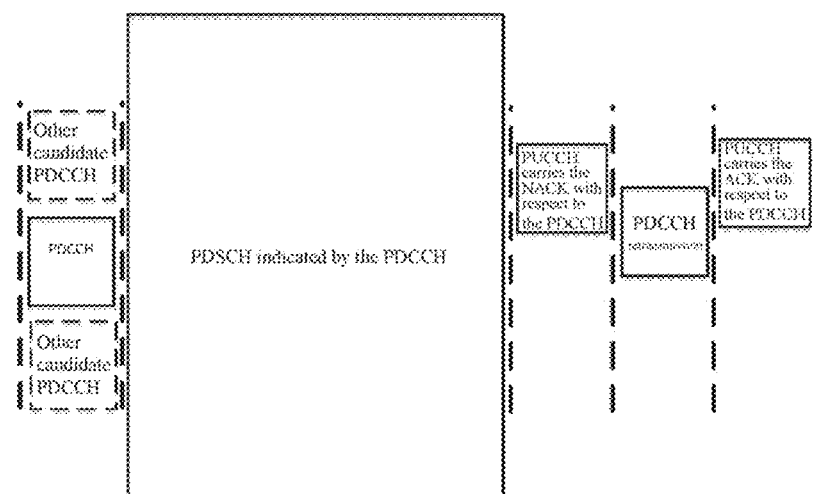
FIG. 13 is a schematic diagram showing a process of performing a HARQ feedback with respect to a PDCCH according to an embodiment of the present disclosure.

FIG. 13 is a schematic diagram showing a process of performing a HARQ feedback with respect to a PDCCH according to an embodiment of the present disclosure. Specifically, FIG. 13 is a schematic diagram showing a case of receiving downlink data from the network side device and buffering the received downlink data before transmitting the NACK message with respect to the PDCCH to the network side device. In FIG. 13, the horizontal direction represents a time domain, and the vertical direction represents a frequency domain. As shown in FIG. 13, first, the network side device selects time frequency resources (which occupy one or more OFDM symbols in the time domain and occupy one or more subcarriers in the frequency domain) and transmit DCI to the user equipment through the PDCCH by using the selected time frequency resources. Next, the network side device transmits the PDSCH indicated by DCI to the user equipment. The user equipment buffers the PDSCH. Next, the user equipment decodes the DCI, generates a NACK message with respect to the DCI and transmits the NACK message to the network side device. Here, the user equipment may carry the NACK message by using the PUCCH. Next, the network side device retransmits the PDCCH to the user equipment. Next, the user equipment decodes the retransmitted PDCCH, generates an ACK message with respect to the PDCCH, and transmits the ACK message to the network side device. In addition, the user equipment may demodulate the buffered downlink data by using the correctly decoded PDCCH.

Figure 14:
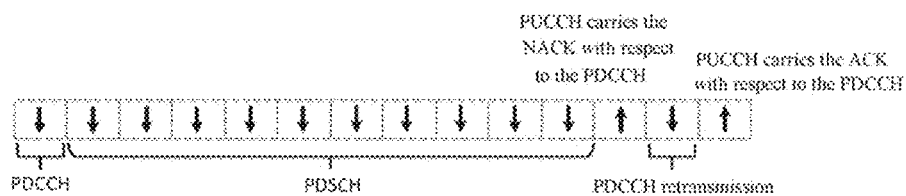
FIG. 14 is a schematic diagram showing a configuration of a time slot in the embodiment shown in FIG. 13.

FIG. 14 is a schematic diagram showing a configuration of a time slot in the embodiment shown in FIG. 13. FIG. 14 is a schematic diagram showing a configuration of a time slot including 14 OFDM symbols. As shown in FIG. 14, a first OFDM symbol of the time slot is used for downlink transmission, and the network side device transmits a PDCCH to the user equipment; a second to eleventh OFDM symbols of the time slot are used for downlink transmission, and the network side device transmits a PDSCH to the user equipment; a twelfth OFDM symbol of the time slot is used for uplink transmission, and the user equipment transmits a PUCCH to the network side device, which carries a NACK message with respect to the DCI; a thirteenth OFDM symbol of the time slot is used for downlink transmission, and the network side device retransmits the PDCCH to the user equipment; a fourteenth OFDM symbol of the time slot is used for uplink transmission, and the user equipment transmits a PUCCH to the network side device, which carries an ACK message with respect to the retransmitted DCI. It is noted that FIG. 14 only shows an exemplary configuration of the time slot. For example, although FIG. 14 shows a case that the PDCCH occupies one OFDM symbol, the PDCCH may also occupy two or three OFDM symbols. In addition, the PDSCH may also occupy other numbers of OFDM symbols.

As described above, according to an embodiment of the present disclosure, the user equipment 100 may transmit downlink data through the PDSCH before decoding the PDCCH correctly. In this case, since the user equipment 100 does not correctly decode the PDCCH, a position of the PDSCH indicated by the PDCCH is not known. In the NR communication system, the user equipment 100 may be pre-configured, by the network side device, with multiple Bandwidth Parts (BWPs) for receiving downlink data. One of the multiple BWPs is in an active state, and the other BWPs are in an inactive state.

According to an embodiment of the present disclosure, the user equipment 100 may receive downlink data on multiple pre-configured BWPs of the user equipment 100 and buffer the received downlink data. That is, the user equipment 100 may search for and receive the downlink data on all (for example, 4) pre-configured BWPs, so as to buffer the downlink data.

According to an embodiment of the present disclosure, the user equipment 100 may receive downlink data on one or more default BWPs of the user equipment 100 and buffer the received downlink data. Here, the default BWP may be a BWP in an active state. That is, the user equipment 100 may search for and receive downlink data on a BWP in an active state, so as to buffer the downlink data. The default BWP may also be a BWP pre-agreed between the user equipment 100 and the network side device, for example, a BWP used by the user equipment 100 last time to receive downlink data. That is, the user equipment 100 may search for and receive downlink data on a BWP pre-agreed with the network side device, so as to buffer the downlink data.

According to an embodiment of the present disclosure, the user equipment 100 may also receive information of the default BWP from the network side device. For example, the information may include identification information of the default BWP. Further, the information may be received through higher layer signaling such as RRC layer signaling or MAC layer signaling, for example. That is, the user equipment 100 may search for and receive downlink data on a BWP indicated by the network side device, so as to buffer the downlink data.

According to an embodiment of the present disclosure, the communication unit 110 may also receive an indication message for indicating to buffer downlink data from the network side device. Here, the indication message for indicating to buffer the downlink data may include, for example, indication information of time domain resources and frequency domain resources for carrying the downlink data. For example, the indication information may be carried in a more compact or compressed DCI format. In this way, the user equipment 100 may obtain a resource position of the downlink data through the indication message, so as to receive and buffer the downlink data. Further, after the user equipment 100 receives complete DCI information subsequently, the user equipment 100 may demodulate the buffered downlink data by using the completed DCI.

Figure 15:
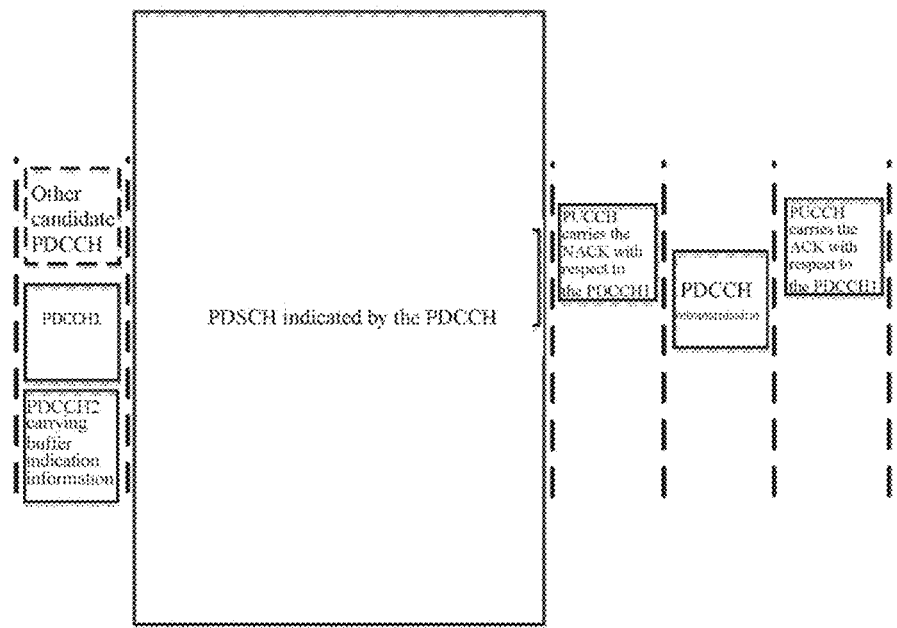
FIG. 15 is a schematic diagram showing a process of performing a HARQ feedback with respect to a PDCCH according to an embodiment of the present disclosure.

FIG. 15 is a schematic diagram showing a process of performing a HARQ feedback with respect to a PDCCH according to an embodiment of the present disclosure. Specifically, FIG. 15 is a schematic diagram showing a case that the network side device transmits buffer indication information to the user equipment. In FIG. 15, the horizontal direction represents a time domain, and the vertical direction represents a frequency domain. As shown in FIG. 15, first, the network side device selects time frequency resources (which occupy one or more OFDM symbols in the time domain and occupy one or more subcarriers in the frequency domain) and transmit a first DCI (which is labeled by PDCCH1 in FIG. 15) to the user equipment through the PDCCH by using the selected time frequency resources. In addition, the network side device may also select time frequency resources and transmit a second DCI (which is labeled by PDCCH2 in FIG. 15) to the user equipment through the PDCCH by using the selected time frequency resources. Here, the second DCI carries buffer indication information for indicating the user equipment to buffer the downlink data. Next, the network side device transmits a PDSCH to the user equipment. The user equipment buffers the PDSCH according to position information of a resource for transmitting downlink data carried in the second DCI. Next, the user equipment decodes the first DCI and generates a NACK message with respect to the first DCI and transmits the NACK message to the network side device. Here, the user equipment may carry the NACK message by using the PUCCH. Next, the network side device retransmits the PDCCH1 to the user equipment. Next, the user equipment decodes the retransmitted PDCCH1, generates an ACK message with respect to the PDCCH1, and transmits the ACK message to the network side device. In addition, the user equipment may demodulate the buffered downlink data by using the correctly decoded PDCCH1.

As described above, according to an embodiment of the present disclosure, the network side device may transmit an indication message for indicating to buffer downlink data to the user equipment 100, or may not transmit the indication message for indicating to buffer downlink data to the user equipment 100. In the latter case, the user equipment 100 may receive the downlink data on a BWP pre-agreed with the network side device or indicated by the network side device.

In view of the above, it can be seen that the user equipment 100 according to the embodiment of the present disclosure may determine whether to perform a HARQ feedback with respect to DCI according to content of the DCI carried by the PDCCH. Further, the user equipment 100 may perform the HARQ feedback only in a case that the DCI includes control information related to downlink transmission, thereby saving overhead while improving the transmission reliability. In addition, in order to further save overhead and reduce latency, the user equipment 100 may combine multiple HARQ feedback messages and transmit a combined HARQ feedback message. Further, the user equipment 100 may also buffer the downlink data before decoding the PDCCH correctly. In view of the above, with the user equipment 100 according to the embodiment of the present disclosure, the application of the HARQ feedback mechanism on the PDCCH can be realized, and the transmission reliability of the DCI carried by the PDCCH can be improved.

3. Configuration Example of a User Equipment that Backs-Up a PDCCH

The user equipment 100 for improving the transmission reliability of a PDCCH according to another embodiment of the present disclosure is described in detail below. The user equipment 100 may also adopt the structural configuration as shown in FIG. 1.

According to an embodiment of the present disclosure, the communication unit 110 may receive first data information, second data information, first control information with respect to the first data information, and second control information with respect to the second data information from the network side device, where the first data information includes the second control information, and the second data information includes the first control information.

According to an embodiment of the present disclosure, the demodulation unit 120 may decode the information received from the network side device, including the first data information, the second data information, the first control information, and the second control information, to obtain the first data information and the second data information.

As described above, with the user equipment 100 according to the embodiment of the present disclosure, the first control information and the second control information are received twice, thereby achieving diversity gain, thus further improving the transmission reliability of the PDCCH.

According to an embodiment of the present disclosure, the first data information and the second data information may be downlink data information carried by the PDSCH, and the first control information and the second control information may be downlink control information carried by the PDCCH.

Figure 16:
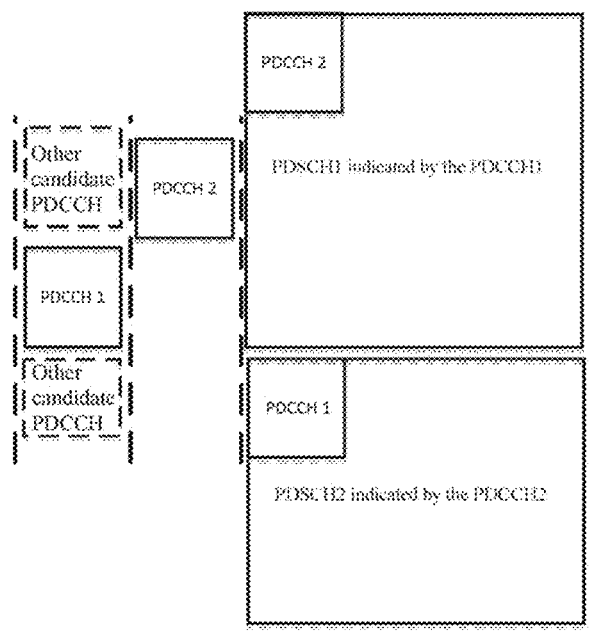
FIG. 16 is a schematic diagram showing a process of backing-up a PDCCH according to an embodiment of the present disclosure.

FIG. 16 is a schematic diagram showing a process of backing-up a PDCCH according to an embodiment of the present disclosure. In FIG. 16, the horizontal direction represents a time domain, and the vertical direction represents a frequency domain. As shown in FIG. 16, first, the network side device selects time frequency resources (which occupy one or more OFDM symbols in the time domain and occupy one or more subcarriers in the frequency domain) and transmit a first DCI (which is labeled by PDCCH1 in FIG. 16) to the user equipment through the PDCCH by using the selected time frequency resources. In addition, the network side device may also select time frequency resources and transmit a second DCI (which is labeled by PDCCH2 in FIG. 16) to the user equipment through the PDCCH by using the selected time frequency resources. Next, the network side device transmits first data information (which is labeled by PDSCH1 in FIG. 16) to the user equipment through the PDSCH. The first data information here includes the second DCI. Further, the network side device may also transmit second data information (which is labeled by PDSCH2 in FIG. 16) to the user equipment through the PDSCH. The second data information here includes the first DCI.

According to an embodiment of the present disclosure, the user equipment 100 may receive the first data information, the first control information, the second data information, and the second control information from the same network side device providing service for the user equipment 100. That is, the first control information and the second control information are different downlink control information from the same network side device, and the first data information and the second data information are different downlink data information from the same network side device. The network side device here may be, for example, a base station or a TRP.

According to an embodiment of the present disclosure, the user equipment 100 may also receive the above information from different network side devices that provide service for the user equipment 100. For example, the user equipment 100 receives the first control information and the first data information from a first network side device, and receives the second control information and the second data information from a second network side device. That is, the first control information is downlink control information from the first network side device, the first data information is downlink data information from the first network side device, the second control information is downlink control information from the second network side device, and the second data information is downlink data information from the second network side device. The first and second network side devices here may be TRPs, for example.

According to an embodiment of the present disclosure, the first network side device and the second network side device may exchange control information through an Xn interface (an interface between TRPs). For example, the first network side device transmits the first control information to the second network side device through the Xn interface for the second network side device to encode the first control information in the second data information, and the second network side device may transmit the second control information to the first network side device through the Xn interface for the first network side device to encode the second control information in the first data information.

According to an embodiment of the present disclosure, the demodulation unit 120 may decode the first control information, and decode the first data information by using the correctly decoded first control information. Further, the decoding unit 120 may also decode the second control information, and decode the second data information by using the correctly decoded second control information.

According to an embodiment of the present disclosure, in a case that the demodulation unit 120 does not correctly decode the first control information and only correctly decodes the second control information, the demodulation unit 120 may decode the second data information by using the correctly decoded second control information, so as to determine the first control information included in the second data information according to the decoded second data information. Next, the demodulation unit 120 may decode the first data information by using the obtained first control information.

According to an embodiment of the present disclosure, in a case that the demodulation unit 120 does not correctly decode the second control information and only correctly decodes the first control information, the demodulation unit 120 may decode the first data information by using the correctly decoded first control information, so as to determine the second control information included in the first data information according to the decoded first data information. Next, the demodulation unit 120 may decode the second data information by using the obtained second control information.

Taking the embodiment shown in FIG. 16 as an example, after receiving the PDCCH1 and the PDCCH2, the user equipment 100 decodes PDCCH1 and PDCCH2. In a case that the user equipment 100 correctly decodes both the PDCCH1 and the PDCCH2, the user equipment 100 may decode the PDSCH1 by using the correctly decoded PDCCH1 to obtain downlink data carried by the PDSCH1, and decode PDSCH2 by using the correctly decoded PDCCH2 to obtain downlink data carried by the PDSCH2. In a case that the user equipment 100 correctly decodes the PDCCH1 and does not correctly decode the PDCCH2, the user equipment 100 may decode the PDSCH1 by using the correctly decoded PDCCH1 to obtain downlink data carried by the PDSCH1, so as to obtain the PDCCH2 included in the PDSCH1, and decodes the PDSCH2 by using the obtained PDCCH2 to obtain downlink data carried by the PDSCH2. In a case that the user equipment 100 correctly decodes the PDCCH2 and does not correctly decode the PDCCH1, the user equipment 100 may decode the PDSCH2 by using the correctly decoded PDCCH2, to obtain downlink data carried by PDSCH2, so as to obtain the PDCCH1 included in the PDSCH2, and decodes the PDSCH1 by using the obtained PDCCH1, to obtain downlink data carried by the PDSCH1.

As described above, the user equipment 100 according to an embodiment of the present disclosure may receive the PDCCH1 and the PDCCH2 twice, thereby achieving diversity gain. In this embodiment, the PDCCH1 is copied into the PDSCH2 for transmission, and the PDCCH2 is copied into the PDSCH1 for transmission, which actually achieves "backup" of the PDCCH1 and the PDCCH2. In this way, the user equipment 100 can obtain the downlink data carried by the PDSCH1 and the PDSCH2 only by decoding one of the PDCCH1 and the PDCCH2 correctly, thereby improving the transmission reliability of the PDCCH.

It is noted that although the two DCIs carried by the PDCCH are taken as examples to describe embodiments for improving the transmission reliability of the PDCCH, those skilled in the art should understand that three or more DCIs and corresponding downlink data may also be used to achieve diversity gain. For example, the second control information may be included in the first data information, the third control information may be included in the second data information, and the first control information may be included in the third data information. That is, in a case that there is multiple pieces of data information and multiple pieces of control information transmitted to one user equipment, control information with respect to other data information may be included in each of the multiple pieces of data information, so that each piece of control information is transmitted twice, thereby achieving diversity gain of the control information.

Figure 17:
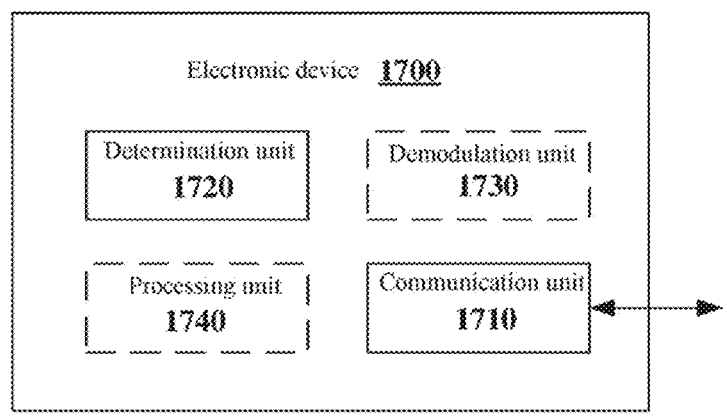
FIG. 17 is a block diagram showing an example of a configuration of an electronic device serving as a network side device according to an embodiment of the present disclosure.

4. Configuration Example of a Network Side Device that Performs a HARQ Feedback with Respect to a PDCCH FIG. 17 is a block diagram showing a structure of an electronic device 1700 serving as a network side device in a wireless communication system according to an embodiment of the present disclosure. As shown in FIG. 17, the electronic device 1700 may include a communication unit 1710 and a determination unit 1720.

Here, each unit of the electronic device 1700 may be included in a processing circuit. It should be noted that the electronic device 1700 may include one processing circuit or multiple processing circuits. Further, the processing circuit may include various discrete functional units to perform various functions and/or operations. It should be noted that these functional units may be physical entities or logical entities, and units with different names may be implemented by the same physical entity.

According to an embodiment of the present disclosure, the communication unit 1710 may transmit a downlink signal including a PDCCH to the user equipment. Here, the PDCCH may carry DCI.

According to an embodiment of the present disclosure, the determination unit 1720 may determine whether to receive a HARQ feedback message with respect to the DCI from the user equipment according to content of the DCI carried by the PDCCH.

As described above, the electronic device 1700 according to the embodiment of the present disclosure may determine whether to receive HARQ feedback with respect to the DCI from the user equipment according to the content of the DCI carried by the PDCCH, thereby realizing the application of the HARQ feedback mechanism on the PDCCH, thus improving the transmission reliability of the DCI carried by the PDCCH.

According to an embodiment of the present disclosure, as shown in FIG. 17, the electronic device 1700 may include a processing unit 1740 configured to generate DCI transmitted to the user equipment by using a specific DCI format, and carry the DCI by the PDCCH.

According to an embodiment of the present disclosure, the determination unit 1720 may determine whether to receive HARQ feedback with respect to the DCI from the user equipment according to whether the DCI carried by the PDCCH includes control information related to uplink transmission or control information related to downlink transmission.

According to an embodiment of the present disclosure, in a case that the DCI includes control information related to the downlink transmission of the electronic device 1700, the determination unit 1720 determines to receive the HARQ feedback with respect to the DCI from the user equipment. Further, in a case that the DCI includes the control information related to the downlink transmission of the electronic device 1700, the DCI may adopt a DCI format 1.

According to an embodiment of the present disclosure, in a case that the DCI includes the control information related to the uplink transmission of the electronic device 1700, the determination unit 1720 determines not to receive the HARQ feedback with respect to the DCI from the user equipment. Further, in a case that the DCI includes the control information related to the uplink transmission of the electronic device 1700, the DCI may adopt a DCI format 0.

According to an embodiment of the present disclosure, in a case that the determination unit 1720 determines to receive the HARQ feedback with respect to the DCI from the user equipment, after transmitting the DCI, it is required to wait for a HARQ feedback message with respect to the DCI, and determine whether to perform retransmission of the DCI according to the HARQ feedback message. In a case that the determination unit 1720 determines not to receive the HARQ feedback with respect to the DCI from the user equipment, after transmitting the DCI, it is unnecessary to wait for the HARQ feedback message with respect to the DCI, and subsequent operations can be performed directly, for example, receiving the uplink data transmitted by the user equipment through the PUSCH or transmitting the downlink data to the user equipment through the PDSCH.

According to an embodiment of the present disclosure, as shown in FIG. 17, the electronic device 1700 may include a demodulation unit 1730 configured to demodulate the HARQ feedback message in a case that it is required to receive the HARQ feedback message from the user equipment. In addition, the demodulation unit 1730 may also demodulate uplink data from the user equipment.

According to an embodiment of the present disclosure, in a case of receiving an ACK message with respect to the DCI from the user equipment, the communication unit 1710 may transmit downlink data to the user equipment.

Figure 18:
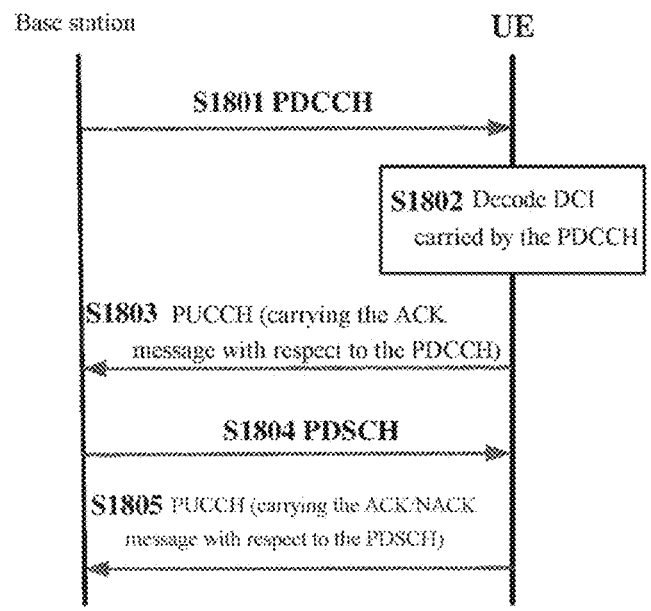
FIG. 18 shows a signaling flowchart of performing a HARQ feedback with respect to a PDCCH according to an embodiment of the present disclosure.

FIG. 18 shows a signaling flowchart of performing HARQ feedback with respect to a PDCCH according to an embodiment of the present disclosure. Specifically, FIG. 18 shows a signaling flowchart in a case that the user equipment correctly decodes DCI, which corresponds to the process shown in FIG. 2. As shown in FIG. 18, in step S1801, a base station transmits a PDCCH to a user equipment (UE), and the PDCCH carries the DCI for the UE. Next, in step S1802, the UE decodes the received DCI which is carried by the PDCCH. In a case that the UE decodes the DCI carried by the PDCCH correctly, an ACK message with respect to the DCI is generated. Next, in step S1803, the UE transmits a PUCCH to the base station, which carries the ACK message with respect to the DCI. Next, in step S1804, the base station transmits downlink data to the UE through the PDSCH. Next, in step S1805, the UE transmits a PUCCH to the base station, which carries an ACK/NACK message with respect to the downlink data.

According to an embodiment of the present disclosure, in a case of receiving a NACK message with respect to the DCI from the user equipment, the communication unit 1710 may retransmit the DCI to the user equipment. Further, the electronic device 1700 may also receive an ACK/NACK message with respect to the retransmitted DCI from the user equipment.

Figure 19:
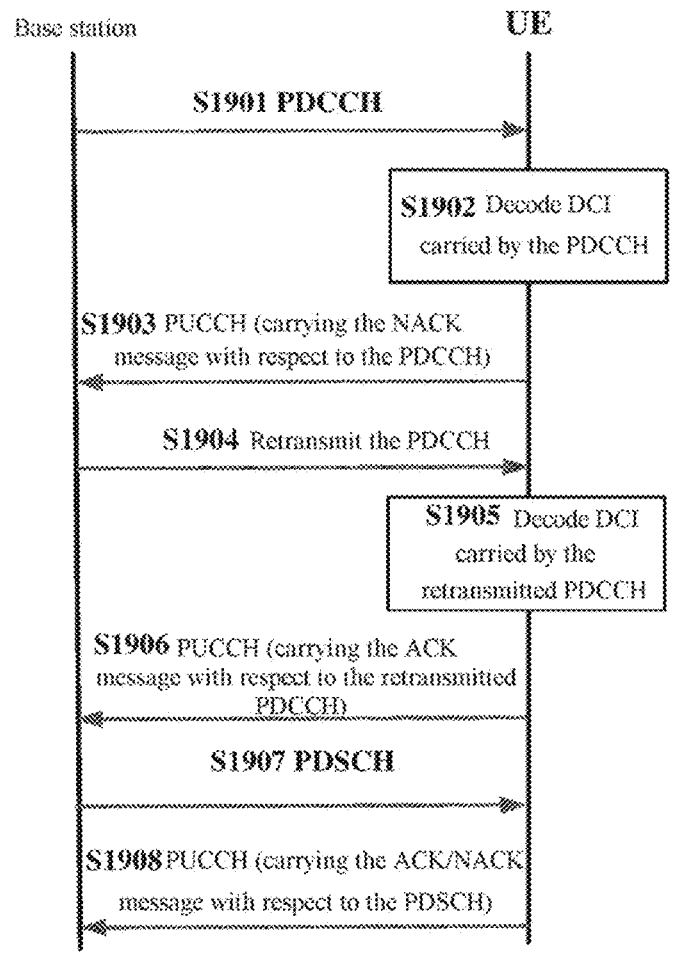
FIG. 19 shows a signaling flowchart of performing a HARQ feedback with respect to a PDCCH according to an embodiment of the present disclosure.

FIG. 19 shows a signaling flowchart of performing HARQ feedback with respect to a PDCCH according to an embodiment of the present disclosure. Specifically, FIG. 19 shows a signaling flowchart in a case that the user equipment does not correctly decode DCI, which corresponds to the process shown in FIG. 4. As shown in FIG. 19, in step S1901, the base station transmits a PDCCH to the UE, and the PDCCH carries the DCI for the UE. Next, in step S1902, the UE decodes the received DCI which is carried by the PDCCH. In a case that the UE does not correctly decode the DCI carried by the PDCCH, a NACK message with respect to the DCI is generated. Next, in S1903, the UE transmits a PUCCH to the base station, which carries a NACK message with respect to the DCI. Next, in step S1904, the base station retransmits the DCI to the UE through the PDCCH. Next, in step S1905, the UE decodes the retransmitted DCI. In a case that the UE decodes the retransmitted DCI correctly, an ACK message with respect to the retransmitted DCI is generated. Next, in step S1906, the UE transmits a PUCCH to the base station, which carries the ACK message with respect to the retransmitted DCI. Next, in step S1907, the base station transmits downlink data to the UE through the PDSCH. Next, in step S1908, the UE transmits a PUCCH to the base station, which carries an ACK/NACK message with respect to the downlink data. As described above, step S1904 and step S1905 shown in FIG. 19 may be repeated for multiple times until the UE decodes the retransmitted DCI correctly. In addition, the number of retransmissions of the DCI may also be limited, to reduce latency.

According to an embodiment of the present disclosure, the communication unit 1710 may simultaneously transmit downlink data and the retransmitted DCI to the user equipment by using different frequency domain resources.

Figure 20:
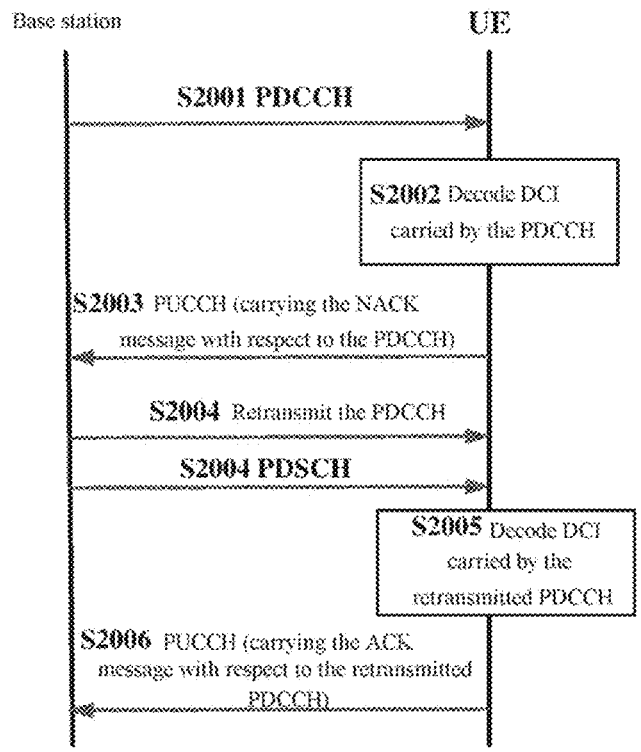
FIG. 20 shows a signaling flowchart of performing a HARQ feedback with respect to a PDCCH according to an embodiment of the present disclosure.

FIG. 20 shows a signaling flowchart of performing HARQ feedback with respect to a PDCCH according to an embodiment of the present disclosure. Specifically, FIG. 20 shows a signaling flowchart in a case that the electronic device simultaneously transmits downlink data and retransmitted DCI by using different frequency domain resources, which corresponds to the process shown in FIG. 6. As shown in FIG. 20, in step S2001, a base station transmits a PDCCH to a UE, and the PDCCH carries DCI for the UE. Next, in step S2002, the UE decodes the received DCI which is carried by the PDCCH. In a case that the UE does not correctly decode the DCI carried by the PDCCH, a NACK message with respect to the DCI is generated. Next, in step S2003, the UE transmits a PUCCH to the base station, which carries the NACK message with respect to the DCI. Next, in step S2004, the base station retransmits the DCI to the UE through the PDCCH. Here, in step S2004, the base station may also transmit downlink data to the UE through the PDSCH by using the same time-domain resources and different frequency-domain resources. Next, in step S2005, the UE decodes the retransmitted DCI. In a case that the UE decodes the retransmitted DCI correctly, an ACK message with respect to the retransmitted DCI is generated. Next, in step S2006, the UE transmits a PUCCH to the base station, which carries the ACK message with respect to the retransmitted DCI.

According to an embodiment of the present disclosure, the communication unit 1710 may retransmit the DCI to the user equipment for one or more times.

Figure 21:
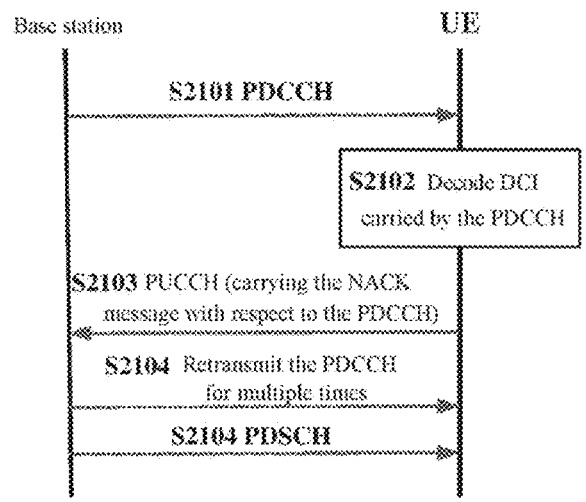
FIG. 21 shows a signaling flowchart of performing a HARQ feedback with respect to a PDCCH according to an embodiment of the present disclosure.

FIG. 21 shows a signaling flowchart of performing HARQ feedback with respect to a PDCCH according to an embodiment of the present disclosure. Specifically, FIG. 21 shows a signaling flowchart in a case that the electronic device retransmits DCI for multiple times, which corresponds to the process shown in FIG. 7. As shown in FIG. 21, in step S2101, the base station transmits a PDCCH to the UE, and the PDCCH carries DCI for the UE. Next, in step S2102, the UE decodes the received DCI which is carried by the PDCCH. In a case that the UE does not correctly decode the DCI carried by the PDCCH, a NACK message with respect to the DCI is generated. Next, in S2103, the UE transmits a PUCCH to the base station, which carries the NACK message with respect to the DCI. Next, in step S2104, the base station retransmits the DCI to the UE for multiple times through the PDCCH. Here, in step S2104, the base station may also transmit downlink data to the UE through the PDSCH by using the same time-domain resources and different frequency-domain resources. As shown in FIG. 21, in a case that the electronic device 1700 retransmits the DCI for multiple times, it may be unnecessary to receive a HARQ feedback message with respect to the retransmitted DCI from the user equipment.

According to an embodiment of the present disclosure, the communication unit 1710 may transmit the DCI carried by the PDCCH to the user equipment and transmit the downlink data carried by the PDSCH to the user equipment. Further, in a case that the content of the DCI indicates that it is required to receive a HARQ feedback message from the user equipment, the communication unit 1710 may receive a combined HARQ feedback message from the user equipment. The HARQ feedback message includes a HARQ feedback message with respect to the DCI and a HARQ feedback message with respect to the downlink data.

According to an embodiment of the present disclosure, in a case that the combined HARQ feedback message indicates that the user equipment correctly decodes the DCI and does not correctly decode the downlink data, the communication unit 1710 may retransmit the downlink data to the user equipment.

According to an embodiment of the present disclosure, in a case that the user equipment combines the feedback information with respect to the PDCCH and the PDSCH, in a case that the user equipment correctly decodes the PDCCH and does not correctly decode the PDSCH, the electronic device 1700 may only retransmit the PDSCH to the user equipment. In this way, the user equipment decodes the retransmitted PDSCH by using the PDCCH which has been decoded correctly to obtain the downlink data.

According to an embodiment of the present disclosure, in a case that the combined HARQ feedback message indicates that the user equipment does not correctly decode the DCI and does not correctly decode the downlink data, the communication unit 1710 may retransmit the DCI to the user equipment.

According to an embodiment of the present disclosure, in a case that the user equipment combines feedback information with respect to the PDCCH and the PDSCH, in a case that the user equipment does not correctly decode the PDCCH, the user equipment also cannot decode the PDSCH correctly. In this case, the electronic device 1700 may only retransmit the PDCCH to the user equipment. In this way, the user equipment decodes the previously buffered PDSCH by using the retransmitted PDCCH to obtain the downlink data. Therefore, since only a PDCCH with a small amount of data is to be retransmitted, overhead can be saved and latency can be reduced.

Figure 22:
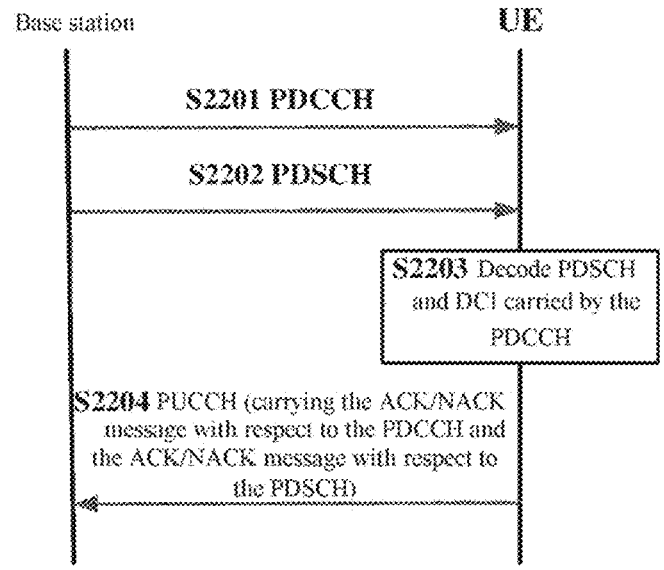
FIG. 22 shows a signaling flowchart of performing a HARQ feedback with respect to a PDCCH according to an embodiment of the present disclosure.

FIG. 22 shows a signaling flowchart of performing HARQ feedback with respect to a PDCCH according to an embodiment of the present disclosure. Specifically, FIG. 22 shows a signaling flowchart in a case that the user equipment combines feedback messages with respect to the PDCCH and the PDSCH, which corresponds to the process shown in FIG. 8. As shown in FIG. 22, in step S2201, the base station transmits a PDCCH to the UE, and the PDCCH carries the DCI for the UE. Next, in step S2202, the base station transmits downlink data to the UE through the PDSCH. Next, in step S2203, the UE decodes the received DCI which is carried by the PDCCH, and decodes the downlink data carried by the PDSCH. Next, in step S2204, the UE transmits a PUCCH to the base station, which carries an ACK/NACK message with respect to the DCI and an ACK/NACK message with respect to the downlink data.

According to an embodiment of the present disclosure, the communication unit 1710 may also transmit multiple DCIs carried through the PDCCH to the user equipment. Further, the communication unit 1710 may also receive a combined HARQ feedback message from the user equipment, and the combined HARQ feedback message includes a HARQ feedback message with respect to each of the multiple DCIs.

Figure 23:
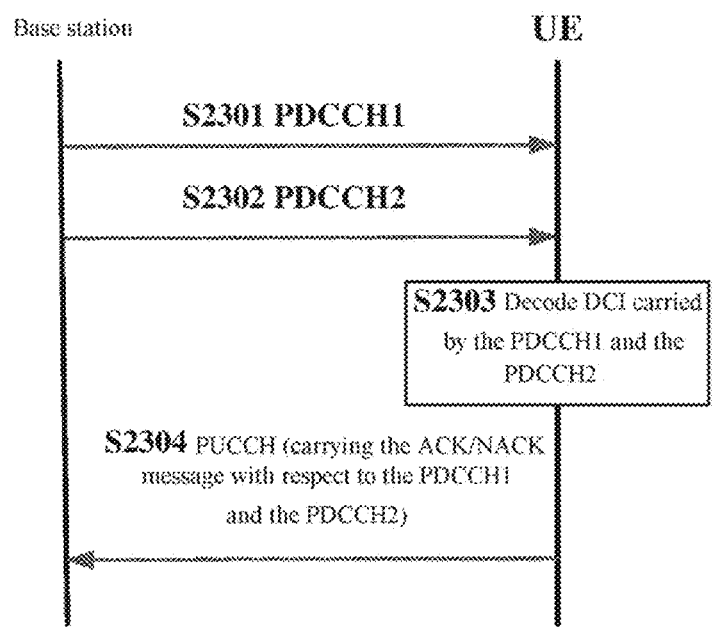
FIG. 23 shows a signaling flowchart of performing a HARQ feedback with respect to a PDCCH according to an embodiment of the present disclosure.

FIG. 23 shows a signaling flowchart of performing HARQ feedback with respect to a PDCCH according to an embodiment of the present disclosure. Specifically, FIG. 23 shows a signaling flowchart in a case that the user equipment combines feedback messages with respect to multiple DCIs, which corresponds to the process shown in FIG. 9. As shown in FIG. 23, in step S2301, the base station transmits a PDCCH1 to the UE, and the PDCCH1 carries a first DCI for the UE. Next, in step S2302, the base station transmits a PDCCH2 to the UE, and the PDCCH2 carries a second DCI for the UE. Next, in step S2303, the UE decodes the received first DCI carried by the PDCCH1 and the second DCI carried by the PDCCH2. Next, in step S2304, the UE transmits a PUCCH to the base station, which carries an ACK/NACK message with respect to the first DCI and an ACK/NACK message with respect to the second DCI.

According to an embodiment of the present disclosure, before retransmitting the DCI to the user equipment, the communication unit 1710 may transmit downlink data to the user equipment for the user equipment to buffer the downlink data.

Figure 24:
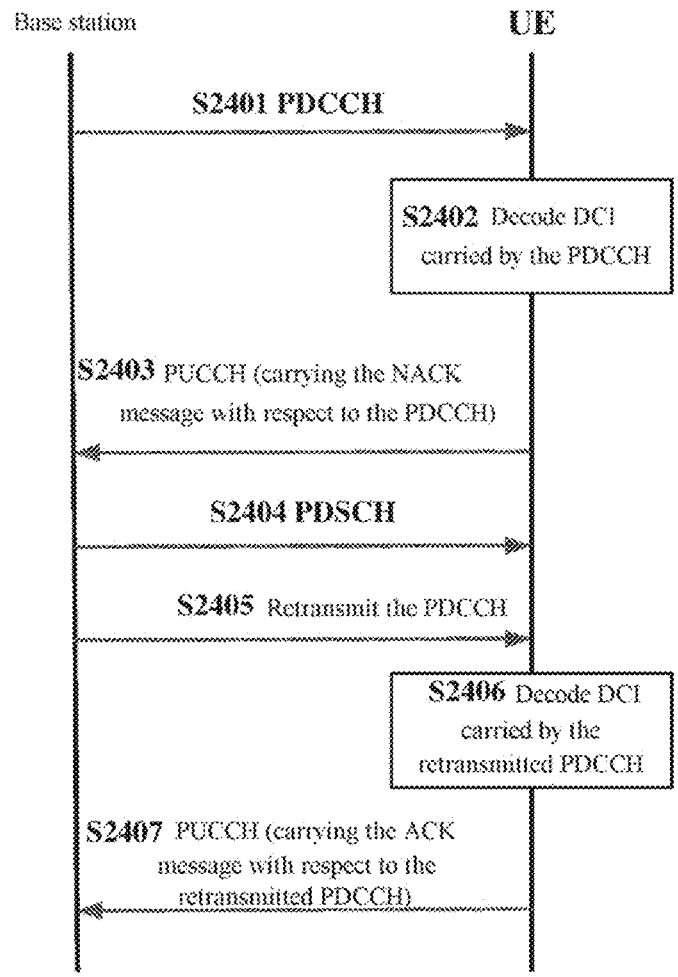
FIG. 24 shows a signaling flowchart of performing a HARQ feedback with respect to a PDCCH according to an embodiment of the present disclosure.

FIG. 24 shows a signaling flowchart of performing HARQ feedback with respect to a PDCCH according to an embodiment of the present disclosure. Specifically, FIG. 24 shows a signaling flowchart in a case that downlink data is first transmitted to the user equipment and then DCI is retransmitted to the user equipment, which corresponds to the process shown in FIG. 11. As shown in FIG. 24, in step S2401, the base station transmits a PDCCH to the UE, and the PDCCH carries DCI for the UE. Next, in step S2402, the UE decodes the received DCI which is carried by the PDCCH. In a case that the UE does not correctly decode the DCI carried by the PDCCH, a NACK message with respect to the DCI is generated. Next, in step S2403, the UE transmits a PUCCH to the base station, which carries the NACK message with respect to the DCI. Next, in step S2404, the base station transmits downlink data to the UE through the PDSCH, and the UE buffers the received downlink data. Next, in S2405, the base station retransmits the DCI to the UE through the PDCCH. Next, in step S2406, the UE decodes the retransmitted DCI. In a case that the UE correctly decodes the retransmitted DCI, the correctly decoded DCI may be used to decode the buffered downlink data. Next, in step S2407, the UE transmits a PUCCH to the base station, which carries an ACK message with respect to the retransmitted DCI.

Figure 25:
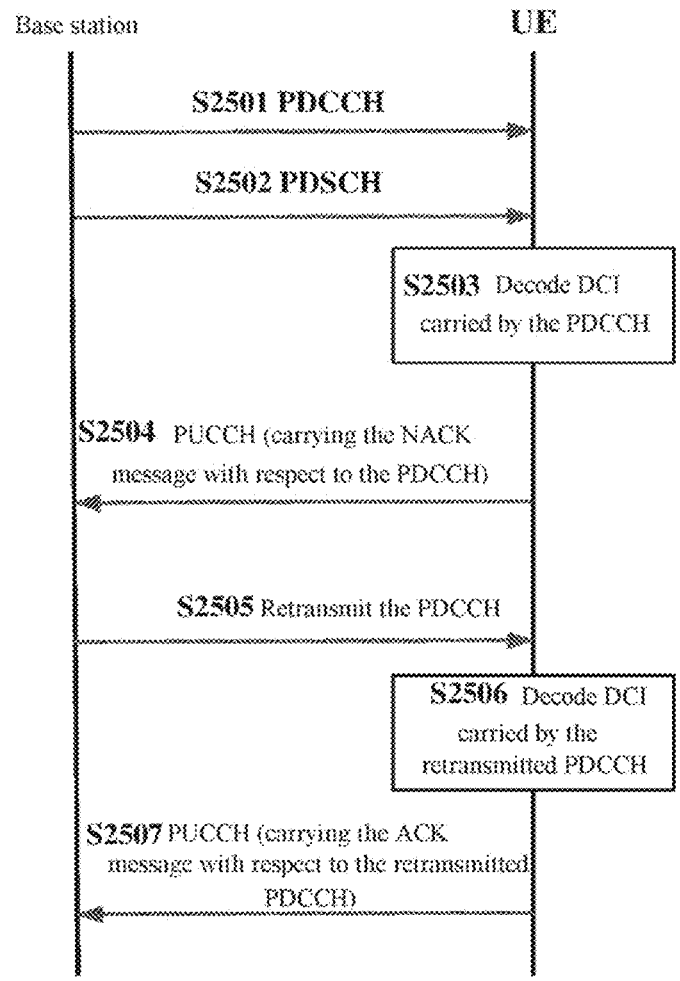
FIG. 25 shows a signaling flowchart of performing a HARQ feedback with respect to a PDCCH according to an embodiment of the present disclosure.

FIG. 25 shows a signaling flowchart of performing HARQ feedback with respect to a PDCCH according to an embodiment of the present disclosure. Specifically, FIG. 25 shows a signaling flowchart in a case that downlink data is first transmitted to the user equipment and then DCI is retransmitted to the user equipment, which corresponds to the process shown in FIG. 13. As shown in FIG. 25, in step S2501, the base station transmits a PDCCH to the UE, and the PDCCH carries DCI for the UE. Next, in step S2502, the base station transmits downlink data to the UE through the PDSCH, and the UE buffers the received downlink data. Next, in step S2503, the UE decodes the received DCI which is carried by the PDCCH. In a case that the UE does not correctly decode the DCI carried by the PDCCH, a NACK message with respect to the DCI is generated. Next, in step S2504, the UE transmits a PUCCH to the base station, which carries the NACK message with respect to the DCI. Next, in step S2505, the base station retransmits the DCI to the UE through the PDCCH. Next, in step S2506, the UE decodes the retransmitted DCI. In a case that the UE correctly decodes the retransmitted DCI, the correctly decoded DCI may be used to decode the buffered downlink data. Next, in step S2507, the UE transmits a PUCCH to the base station, which carries an ACK message with respect to the retransmitted DCI. In FIG. 25, step S2502 and step S2503 may be performed simultaneously, that is, the base station transmits the PDSCH to the UE in step S2502, and simultaneously, the UE decodes the DCI in step S2503.

According to an embodiment of the present disclosure, the communication unit 1710 may also transmit information of a default BWP to the user equipment, for the user equipment to search for and receive downlink data on the default BWP indicated by the electronic device 1700, so as to buffer the downlink data. For example, the information may include identification information of the default BWP. Further, the electronic device 1700 may transmit the information of the default BWP through higher layer signaling such as RRC layer signaling or MAC layer signaling, for example.

According to an embodiment of the present disclosure, the communication unit 1710 may also transmit an indication message for indicating to buffer the downlink data to the user equipment. Here, the indication message for indicating to buffer the downlink data may include, for example, indication information of time domain resources and frequency domain resources for carrying the downlink data. For example, the electronic device 1700 may carry such indication information in a more compact or compressed DCI format. The user equipment may obtain a resource position of the downlink data through the indication message, so as to receive and buffer the downlink data. Further, after receiving the complete DCI information subsequently from the electronic device 1700, the user equipment may demodulate the buffered downlink data.

Figure 26:
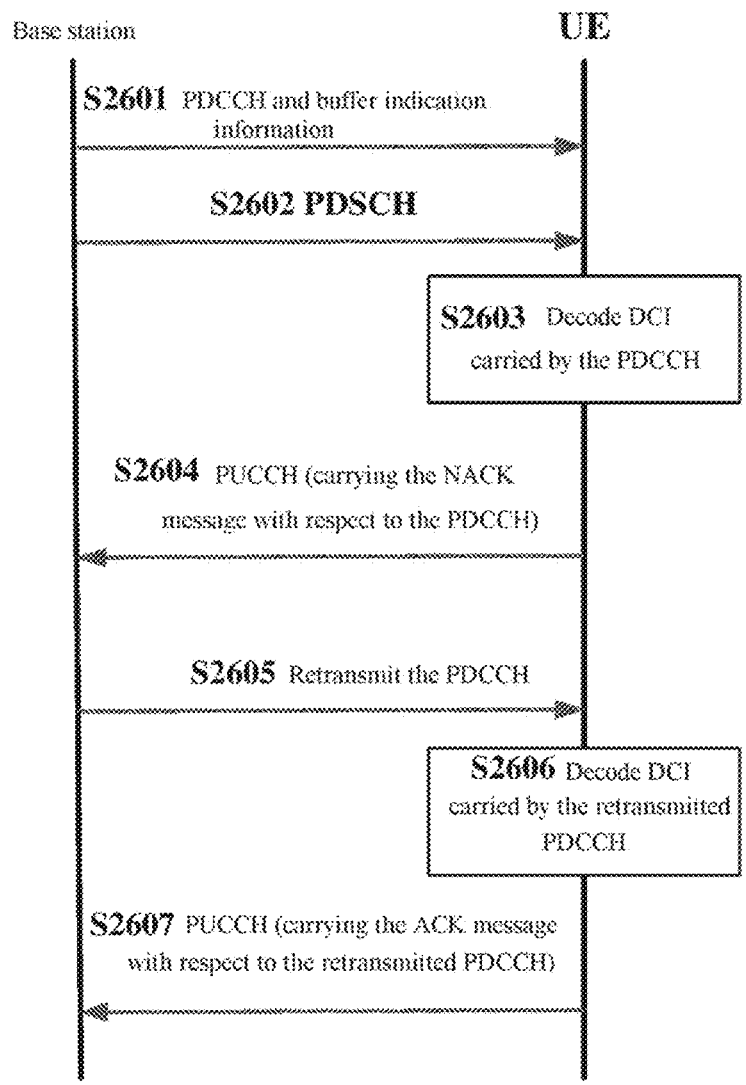
FIG. 26 shows a signaling flowchart of performing a HARQ feedback with respect to a PDCCH according to an embodiment of the present disclosure.

FIG. 26 shows a signaling flowchart of performing HARQ feedback with respect to a PDCCH according to an embodiment of the present disclosure. Specifically, FIG. 26 shows a signaling flowchart in a case that the electronic device transmits buffer indication information to the network side device, which corresponds to the process shown in FIG. 15. As shown in FIG. 26, in step S2601, the base station transmits a PDCCH to the UE, and the PDCCH carries DCI and buffer indication information for the UE. Next, in step S2602, the base station transmits downlink data to the UE through the PDSCH, and the UE buffers the received downlink data. Next, in step S2603, the UE decodes the received DCI which is carried by the PDCCH. In a case that the UE does not correctly decode the DCI carried by the PDCCH, a NACK message with respect to the DCI is generated. Next, in step S2604, the UE transmits a PUCCH to the base station, which carries the NACK message with respect to the DCI. Next, in step S2605, the base station retransmits the DCI to the UE through the PDCCH. Next, in step S2606, the UE decodes the retransmitted DCI. In a case that the UE correctly decodes the retransmitted DCI, the correctly decoded DCI may be used to decode the buffered downlink data. Next, in step S2607, the UE transmits a PUCCH to the base station, which carries an ACK message with respect to the retransmitted DCI. In FIG. 26, step S2602 and step S2603 may be performed simultaneously, that is, the base station transmits the PDSCH to the UE in S2602, and simultaneously, the UE decodes the DCI in step S2603.

As described above, the electronic device 1700 according to an embodiment of the present disclosure may determine whether to receive HARQ feedback with respect to the DCI from the user equipment according to the content of the DCI carried by the PDCCH. Further, the HARQ feedback may be received from the user equipment only in a case that the DCI includes control information related to downlink transmission, thereby saving overhead while improving the transmission reliability. In addition, in order to further save overhead and reduce latency, a combined HARQ feedback message may be received from the user equipment. Further, the electronic device 1700 may transmit downlink data to the user equipment before the user equipment correctly decodes the PDCCH, for the user equipment to buffer the downlink data. In view of the above, with the electronic device 1700 according to the embodiment of the present disclosure, the application of the HARQ feedback mechanism on the PDCCH can be realized, and the transmission reliability of the DCI carried by the PDCCH can be improved.

The electronic device 1700 according to the embodiment of the present disclosure may serve as a network side device, that is, the electronic device 1700 may provide service for the user equipment 100, therefore, all the embodiments regarding the user equipment 100 described above are applicable hereto.

5. Configuration Example of a Network Side Device that Backs-Up a PDCCH

An electronic device 1700 serving as a network side device according to another embodiment of the present disclosure is described in detail below, which can improve the transmission reliability of the PDCCH. The electronic device 1700 may also adopt the structural configuration shown in FIG. 17.

According to an embodiment of the present disclosure, a processing unit 1740 may generate first data information, second data information, first control information with respect to the first data information, and second control information with respect to the second data information, where the first data information includes the second control information, and the second data information includes the first control information.

According to an embodiment of the present disclosure, the communication unit 1710 may transmit the first data information, the second data information, the first control information, and the second control information to the user equipment.

As described above, the electronic device 1700 according to the embodiment of the present disclosure transmits the first control information and the second control information to the user equipment twice, thereby achieving diversity gain, thus further improving the transmission reliability of the PDCCH.

According to an embodiment of the present disclosure, the communication unit 1710 may also receive the second control information with respect to the second data information from other network side device than the electronic device 1700.

According to an embodiment of the present disclosure, the processing unit 1740 may generate the first data information and the first control information with respect to the first data information, and the first data information includes the second control information.

According to an embodiment of the present disclosure, the communication unit 1710 may also transmit the first control information to other network side device, for the other network side device to include the first control information into the second data information.

According to an embodiment of the present disclosure, the communication unit 1710 may transmit the first data information and the first control information to the user equipment. Here, the first data information is downlink data information transmitted by the electronic device 1700 to the user equipment, and the second data information is downlink data information transmitted by the other network side device to the user equipment.

Here, in a case that the electronic device 1700 and other network side device are TRPs, the electronic device 1700 may transmit the first control information to other network side device through the Xn interface, and may receive the second control information from the other network side device through the Xn interface.

According to an embodiment of the present disclosure, the first data information and the second data information may be downlink data information carried by the PDSCH, and the first control information and the second control information may be downlink control information carried by the PDCCH.

As described above, with the electronic device 1700 according to the embodiment of the present disclosure, the first control information is transmitted twice, where the first control information is transmitted to other network side device one time for the other network side device to transmit the first control information to the user equipment, and is directly transmitted to the user equipment for the other time, thereby achieving diversity gain, thus further improving the transmission reliability of the PDCCH.

Figure 27:
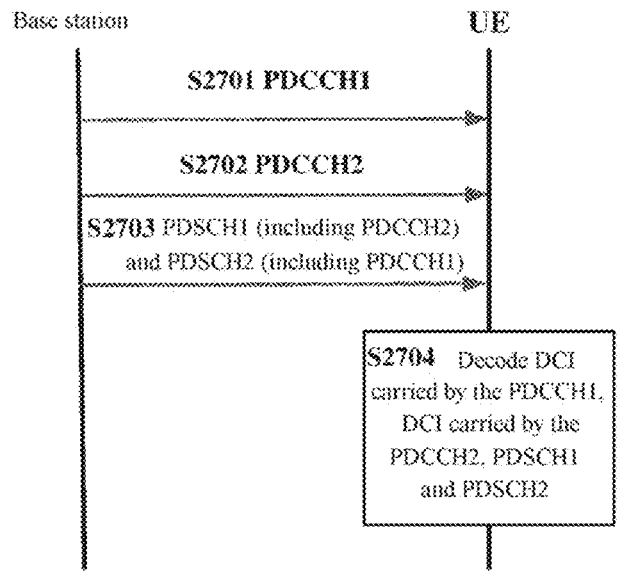
FIG. 27 shows a signaling flowchart of backing-up a PDCCH according to an embodiment of the present disclosure.

FIG. 27 shows a signaling flowchart of backing-up a PDCCH according to an embodiment of the present disclosure. FIG. 27 only shows an embodiment where the first data information and the second data information are transmitted from the same network side device. In FIG. 27, in step S2701, the base station transmits a first DCI carried by a PDCCH1 to the UE. Next, in step S2702, the base station transmits a second DCI carried by a PDCCH2 to the UE. Next, in step S2703, the base station transmits downlink data, including PDCCH2, to the UE through the PDSCH1, and transmits downlink data, including PDCCH1, to the UE through the PDSCH2. Next, in step S2704, the UE decodes the DCI carried by PDCCH1, the DCI carried by PDCCH2, PDSCH1 and PDSCH2 to obtain the downlink data in the PDSCH1 and the downlink data in the PDSCH2.

As described above, the electronic device 1700 according to an embodiment of the present disclosure may transmit the PDCCH1 and the PDCCH2 twice, thereby achieving diversity gain. In this way, the user equipment may obtain the downlink data carried by the PDSCH1 and the PDSCH2 only by decoding one of the PDCCH1 and the PDCCH2 correctly, thereby improving the transmission reliability of the PDCCH.

6. Method Embodiment

Next, a wireless communication method performed by the user equipment 100 in the wireless communication system and a wireless communication method performed by the electronic device 1700 serving as a network side device in the wireless communication system according to embodiments of the present disclosure are described in detail.

Figure 28:
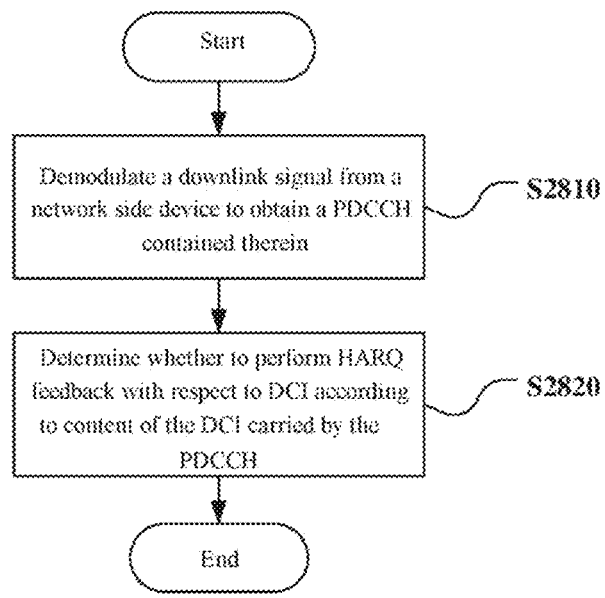
FIG. 28 is a flowchart showing a wireless communication method performed by a user equipment according to an embodiment of the present disclosure.

FIG. 28 is a flowchart showing a wireless communication method performed by the user equipment 100 in the wireless communication system according to an embodiment of the present disclosure.

As shown in FIG. 28, in step S2810, downlink signal from the network side device is demodulated to obtain a PDCCH contained therein.

Next, in step S2820, it is determined whether to perform HARQ feedback with respect to DCI according to content of the DCI carried by the PDCCH.

Preferably, the method further includes: in a case that the DCI includes control information related to downlink transmission of the user equipment 100, performing the HARQ feedback with respect to the DCI.

Preferably, in a case that the DCI includes control information related to the downlink transmission of the user equipment 100, the DCI adopts a DCI format 1.

Preferably, the method further includes: in a case that the DCI includes control information related to the uplink transmission of the user equipment 100, not performing the HARQ feedback with respect to the DCI.

Preferably, in a case that the DCI includes control information related to the uplink transmission of the user equipment 100, the DCI adopts a DCI format 0.

Preferably, the method further includes: in a case that the DCI is correctly decoded, transmitting an ACK message with respect to the DCI to the network side device, and receiving downlink data from the network side device according to the DCI.

Preferably, the method further includes: in a case that the DCI is not correctly decoded, transmitting a NACK message with respect to the DCI to the network side device, and receiving the retransmitted DCI from the network side device.

Preferably, the method further includes: simultaneously receiving downlink data and the retransmitted DCI from the network side device by using different frequency domain resources.

Preferably, the method further includes: before receiving the retransmitted DCI from the network side device, receiving downlink data from the network side device and buffering the downlink data.

Preferably, the method further includes: receiving downlink data on multiple pre-configured BWPs of the user equipment 100 and buffering the downlink data.

Preferably, the method further includes: receiving downlink data on one or more default BWPs of the user equipment 100 and buffering the downlink data.

Preferably, the method further includes: receiving an indication message for indicating to buffer the downlink data from the network side device.

Preferably, the method further includes: transmitting a combined HARQ feedback message to the network side device. The combined HARQ feedback message includes a HARQ feedback message with respect to the DCI and a HARQ feedback message with respect to one or more other DCIs.

Preferably, the method further includes: transmitting a combined HARQ feedback message to the network side device. The combined HARQ feedback message includes a HARQ feedback message with respect to the DCI and a HARQ feedback message with respect to the downlink data carried by the PDSCH.

According to an embodiment of the present disclosure, a main body for performing the above method may be the user equipment 100 according to the embodiment of the present disclosure, therefore, all the embodiments regarding the user equipment 100 described above are applicable hereto.

Next, a wireless communication method performed by the electronic device 1700 serving as a network side device in the wireless communication system according to an embodiment of the present disclosure is described in detail.

Figure 29:
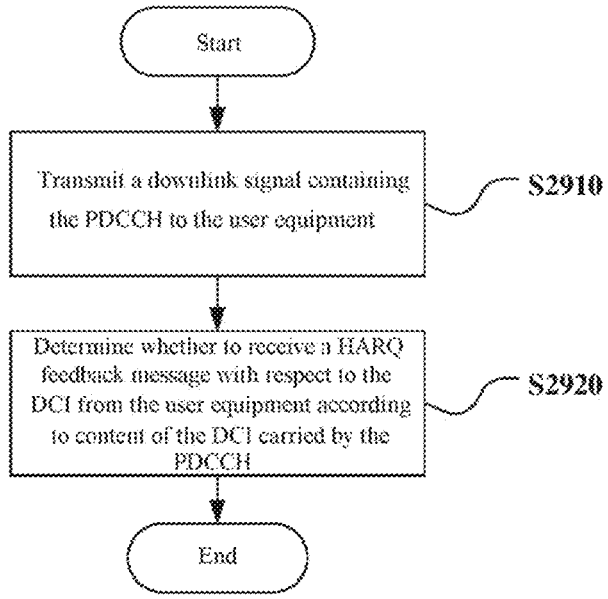
FIG. 29 is a flowchart showing a wireless communication method performed by an electronic device serving as a network side device according to an embodiment of the present disclosure.

FIG. 29 is a flowchart showing a wireless communication method performed by the electronic device 1700 serving as a network side device in the wireless communication system according to an embodiment of the present disclosure.

As shown in FIG. 29, in step S2910, a downlink signal including a PDCCH is transmitted to the user equipment.

Next, in step S2920, it is determined whether to receive a HARQ feedback message with respect to DCI from the user equipment according to content of the DCI carried by the PDCCH.

Preferably, the method further includes: in a case that the DCI includes control information related to downlink transmission of the electronic device 1700, receiving HARQ feedback with respect to the DCI from the user equipment.

Preferably, in a case that the DCI includes control information related to the downlink transmission of the electronic device 1700, the DCI adopts a DCI format 1.

Preferably, the method further includes: in a case that the DCI includes control information related to uplink transmission of the electronic device 1700, not receiving the HARQ feedback with respect to the DCI from the user equipment.

Preferably, in a case that the DCI includes control information related to the uplink transmission of the electronic device 1700, the DCI adopts a DCI format 0.

Preferably, the method further includes: in a case of receiving an ACK message with respect to the DCI from the user equipment, transmitting the downlink data to the user equipment.

Preferably, the method further includes: in a case of receiving a NACK message with respect to the DCI from the user equipment, retransmitting the DCI to the user equipment.

Preferably, the method further includes: simultaneously transmitting downlink data and the retransmitted DCI to the user equipment by using different frequency domain resources.

Preferably, the method further includes: retransmitting the DCI to the user equipment for one or more times.

Preferably, the method further includes: before retransmitting the DCI to the user equipment, transmitting downlink data to the user equipment.

Preferably, the method further includes: transmitting an indication message for indicating to buffer the downlink data to the user equipment.

Preferably, the method further includes: transmitting multiple DCIs to the user equipment; and receiving a combined HARQ feedback message from the user equipment. The HARQ feedback message includes a HARQ feedback message with respect to each of the multiple DCIs.

Preferably, the method further includes: transmitting the DCI carried by the PDCCH to the user equipment and transmitting the downlink data carried by the PDSCH to the user equipment; and receiving a combined HARQ feedback message from the user equipment. The HARQ feedback message includes the HARQ feedback message with respect to the DCI and the HARQ feedback message with respect to the downlink data.

Preferably, the method further includes: in a case that the combined HARQ feedback message indicates that the user equipment correctly decodes the DCI and does not correctly decode the downlink data, retransmitting the downlink data to the user equipment.

Preferably, the method further includes: in a case that the combined HARQ feedback message indicates that the user equipment does not correctly decode the DCI and does not correctly decode the downlink data, retransmitting the DCI to the user equipment.

According to an embodiment of the present disclosure, the main body for performing the above method may be the electronic device 1700 according to the embodiment of the present disclosure, therefore, all the embodiments regarding the electronic device 1700 described above are applicable hereto.

Figure 30:
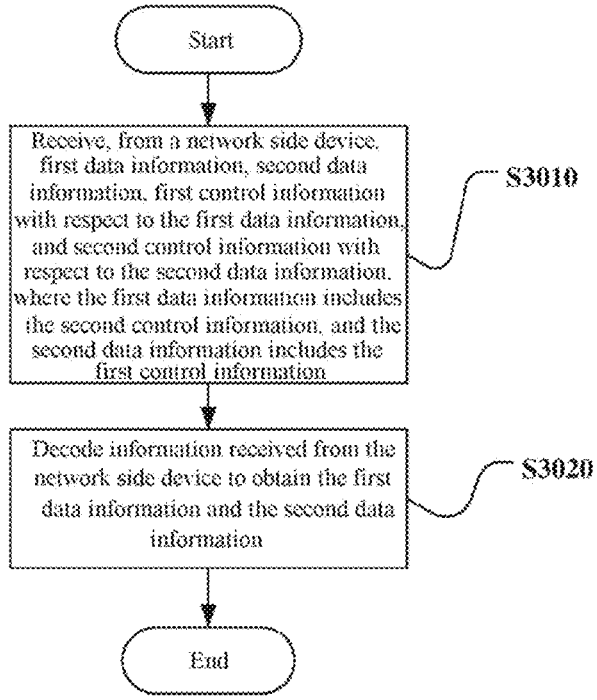
FIG. 30 is a flowchart showing a wireless communication method performed by a user equipment according to an embodiment of the present disclosure.

FIG. 30 is a flowchart showing a wireless communication method performed by the user equipment 100 in the wireless communication system according to another embodiment of the present disclosure.

As shown in FIG. 30, in step S3010, the first data information, the second data information, the first control information with respect to the first data information, and the second control information with respect to the second data information are received from the network side device, where the first data information includes second control information, and the second data information includes first control information.

Next, in step S3020, the information received from the network side device is decoded to obtain the first data information and the second data information.

Preferably, the method further includes: decoding the first control information, and decoding the first data information by using the decoded first control information.

Preferably, the method further includes: determining the second control information by using the decoded first data information; and decoding the second data information by using the determined second control information.

According to an embodiment of the present disclosure, the main body for performing the above method may be the user equipment 100 according to the embodiment of the present disclosure, therefore, all the embodiments regarding the user equipment 100 described above are applicable hereto.

Figure 31A:
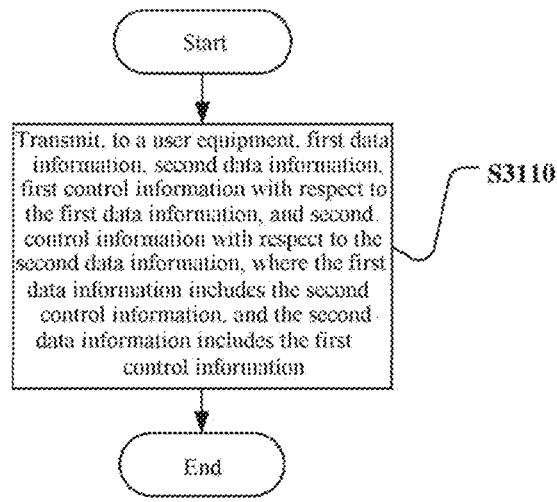
FIG. 31 (a) is a flowchart showing a wireless communication method performed by an electronic device serving as a network side device according to an embodiment of the present disclosure.
Figure 31B:
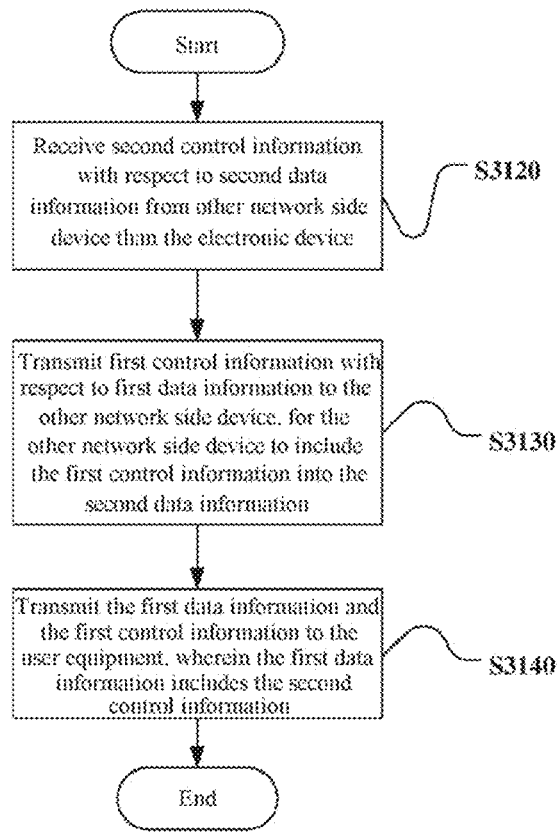

FIG. 31 (a) is a flowchart showing a wireless communication method performed by an electronic device 1700 serving as a network side device in a wireless communication system according to another embodiment of the present disclosure.

As shown in FIG. 31 (a), in step S3110, the first data information, the second data information, the first control information with respect to the first data information, and the second control information with respect to the second data information are transmitted to the user equipment, where the first data information includes the second control information, and the second data information includes the first control information.

According to an embodiment of the present disclosure, the main body for performing the above method may be an electronic device 1700 serving as a network side device according to an embodiment of the present disclosure, therefore, all the embodiments regarding the electronic device 1700 described are applicable hereto.

FIG. 31 (b) is a flowchart showing a wireless communication method performed by an electronic device 1700 serving as a network side device in a wireless communication system according to another embodiment of the present disclosure.

As shown in FIG. 31 (b), in step S3120, the second control information with respect to the second data information is received from other network side device than the electronic device 1700.

Next, in step S3130, the first control information with respect to the first data information is transmitted to the other network side device for the other network side devices to include the first control information into the second data information.

Next, in step S3140, the first data information and the first control information are transmitted to the user equipment, and the first data information includes the second control information.

Here, the first data information is downlink data information transmitted by the electronic device 1700 to the user equipment, and the second data information is downlink data information transmitted by the other network side device to the user equipment.

According to an embodiment of the present disclosure, the main body for performing the above method may be an electronic device 1700 serving as a network side device according to an embodiment of the present disclosure, therefore, all the embodiments regarding the electronic device 1700 described above are applicable hereto.

7. Application Examples

The technology of the present disclosure may be applied to various products.

The network side device may be implemented as any type of TRP. The TRP may have transmitting and receiving functions, for example, may receive information from a user equipment and a base station device, and may also transmit information to the user equipment and base station device. In a typical example, the TRP may provide services for the user equipment and is controlled by the base station device. Further, the TRP may have a structure similar to that of the base station device described below, or may only have a structure related to transmission and reception of information in the base station device.

The network side device may also be implemented as any type of base station device, such as a macro eNB and a small eNB, and may also be implemented as any type of gNB (a base station in a 5G system). The small eNB may be an eNB covering a cell smaller than a macro cell, such as a pico eNB, a micro eNB, and a home (femto) eNB. Instead, the base station may be implemented as any other type of base station, such as a NodeB and a base transceiver station (BTS). The base station may include: a main body (which is also referred to as a base station device) configured to control wireless communication; and one or more remote wireless head ends (RRHs) that are arranged in different places from the main body.

The user equipment may be implemented as a mobile terminal (such as a smart phone, a tablet personal computer (PC), a notebook PC, a portable game terminal, a portable/dongle-type mobile router, and a digital camera) or an in-vehicle terminal (such as a car navigation device). The user equipment may also be implemented as a terminal that performs machine-to-machine (M2M) communication (which is also referred to as a machine type communication (MTC) terminal). In addition, the user equipment may be a wireless communication module (such as an integrated circuit module including a single wafer) installed on each of the user equipment described above.

[Application Examples of the Base Station]

First Application Example

Figure 32:
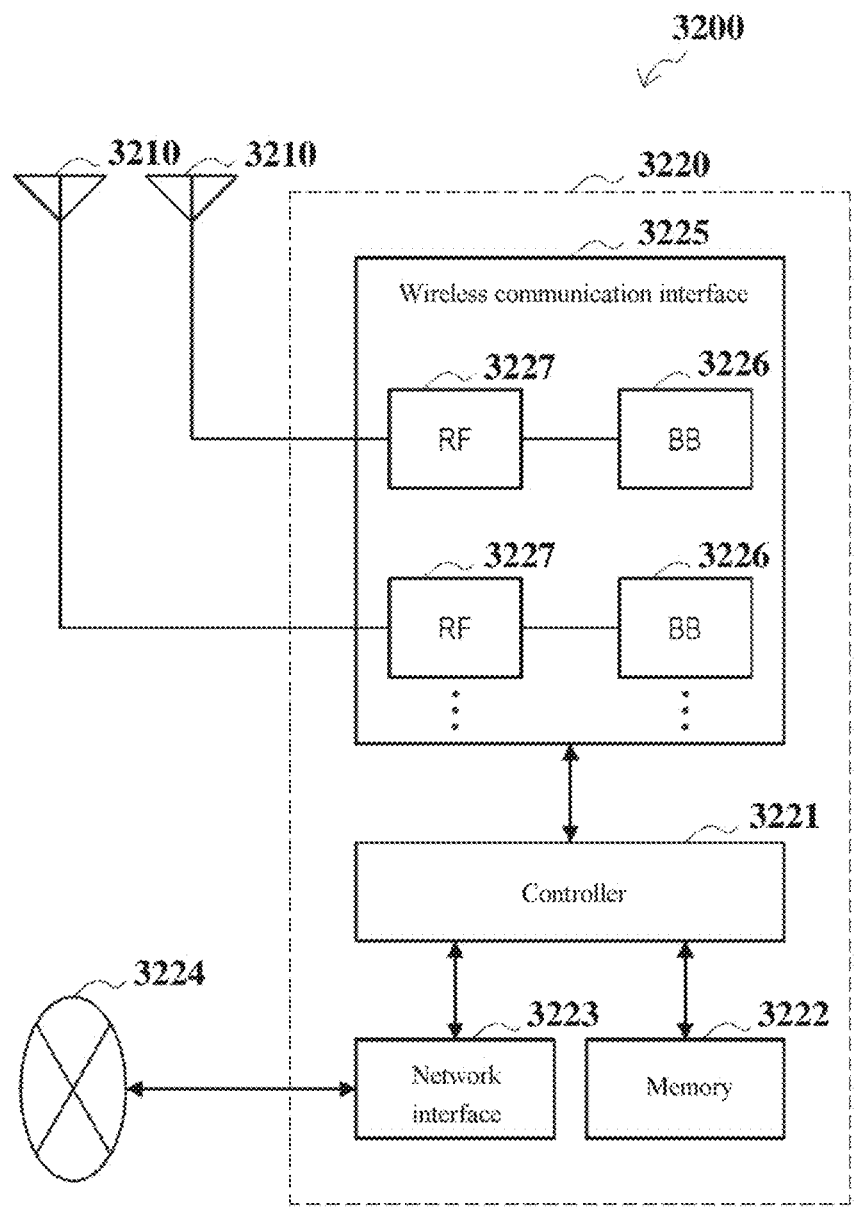
FIG. 32 is a block diagram showing a first example of a schematic configuration of an eNB (Evolved Node B)

FIG. 32 is a block diagram showing a first example of a schematic configuration of an eNB to which the technique of the disclosure may be applied. The eNB 3200 includes a single or multiple antennas 3210 and a base station device 3220. The base station device 3220 and each of the antennas 3210 may be connected via a RF cable.

Each of the antennas 3210 includes a single or multiple antenna elements (such as multiple antenna elements included in a multiple-input multiple-output (MIMO) antenna), and are used for transmitting and receiving wireless signals by the base station device 3220. The eNB 3200 may include the multiple antennas 3210, as shown in FIG. 32. For example, the multiple antennas 3210 may be compatible with multiple frequency bands used by the eNB 3200. Although FIG. 32 shows an example in which the eNB 3200 includes the multiple antennas 3210, the eNB 3200 may also include a single antenna 3210.

The base station device 3220 includes a controller 3221, a memory 3222, a network interface 3223, and a wireless communication interface 3225.

The controller 3221 may be, for example, a CPU or a DSP, and operates various functions of a higher layer of the base station device 3220. For example, the controller 3221 generates a data packet based on data in a signal processed by the wireless communication interface 3225, and transfers the generated packet via the network interface 3223. The controller 3221 may bundle data from multiple baseband processors to generate bundled packet, and transfer the generated bundled packet. The controller 3221 may have logical functions of performing control such as radio resource control, radio bearer control, mobility management, admission control, and scheduling. The control may be performed in conjunction with an adjacent eNB or a core network node. The memory 3222 includes RAM and ROM, and stores a program that is executed by the controller 3221, and various types of control data (such as a terminal list, transmitting power data, and scheduling data).

The network interface 3223 is a communication interface for connecting the base station device 3220 to a core network 3224. The controller 3221 may communicate with a core network node or another eNB via the network interface 3223. In that case, the eNB 3200, and the core network node or the other eNB may be connected to each other through a logical interface (such as an S1 interface and an X2 interface). The network interface 3223 may be a wired communication interface or a wireless communication interface for a wireless backhaul line. If the network interface 3223 is a wireless communication interface, the network interface 1823 may use a higher frequency band for wireless communication than a frequency band used by the wireless communication interface 3225.

The wireless communication interface 3225 supports any cellular communication scheme (such as Long Term Evolution (LTE) and LTE-Advanced), and provides wireless connection to a terminal positioned in a cell of the eNB 3200 via the antenna 3210. The wireless communication interface 3225 may typically include, for example, a baseband (BB) processor 3226 and an RF circuit 3227. The BB processor 3226 may perform, for example, coding/decoding, modulation/demodulation and multiplexing/de-multiplexing, and perform various types of signal processes of the layer (for example L1, media access control (MAC), radio link control (RLC) and packet data convergence protocol (PDCP)). Instead of the controller 3221, the BB processor 3226 may have a part or all of the above logical functions.

The BB processor 3226 may be a memory storing communication control programs, or a module including a processor and a related circuit which are configured to execute the programs. Updating the program may allow the functions of the BB processor 3226 to be changed. The module may be a card or a blade that is inserted into a slot of the base station device 3220. Alternatively, the module may be a chip that is mounted on the card or the blade. In addition, the RF circuit 3227 may include, for example, a frequency mixer, a filter or an amplifier, and transmits and receives wireless signals via the antenna 3210.

As shown in FIG. 32, the wireless communication interface 3225 may include multiple BB processors 3226. For example, the multiple BB processors 3226 may be compatible with multiple frequency bands used by the eNB 3200. As shown in FIG. 32, the wireless communication interface 3225 may include multiple RF circuits 3227. For example, the multiple RF circuits 3227 may be compatible with multiple antenna elements. Although FIG. 32 shows an example in which the wireless communication interface 3225 includes multiple BB processors 3226 and multiple RF circuits 3227, the wireless communication interface 3225 may include a single BB processor 3226 and a single RF circuit 3227.

Second Application Example

Figure 33:
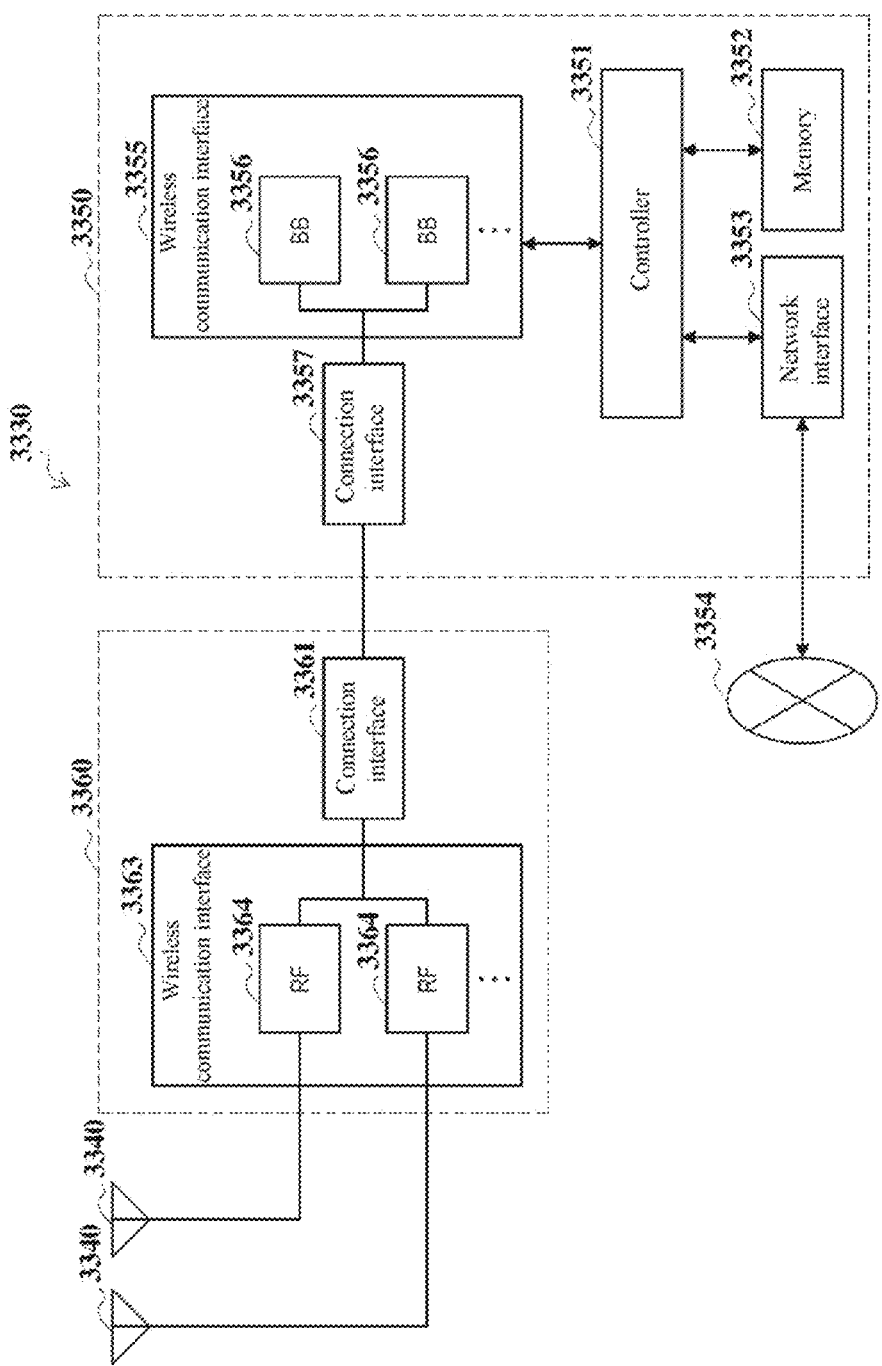
FIG. 33 is a block diagram showing a second example of the schematic configuration of the eNB.

FIG. 33 is a block diagram showing a second example of a schematic configuration of an eNB to which the technique of the present disclosure may be applied. An eNB 3330 includes a single or multiple antennas 3340, a base station device 3350 and an RRH 3360. Each antenna 3340 and the RRH 3360 may be connected to each other via an RF cable. The base station device 3350 and the RRH 3360 may be connected to each other via a high-speed line such as a fiber cable.

Each of the antennas 3340 includes a single or multiple antenna elements (such as multiple antenna elements included in a multiple-input multiple-output (MIMO)

antenna), and is used for the RRH 3360 to transmit and receive wireless signals. As shown in FIG. 33, the eNB 3330 may include multiple antennas 3340. For example, the multiple antennas 3340 may be compatible with multiple frequency bands used by the eNB 3330. Although FIG. 33 shows an example that the eNB 3330 includes multiple antennas 3340, the eNB 3330 may also include a single antenna 3340.

The base station device 3350 includes a controller 3351, a memory 3352, a network interface 3353, a wireless communication interface 3355, and a connection interface 3357. The controller 3351, the memory 3352, and the network interface 3353 are the same as the controller 3221, the memory 3222, and the network interface 3223 described with reference to FIG. 32.

The wireless communication interface 3355 supports any cellular communication solution (such as LTE and LTE-advanced), and provides wireless communication with a terminal located in a sector corresponding to the RRH 3360 via the RRH 3360 and the antenna 3340. The wireless communication interface 3355 may typically include, for example, a BB processor 3356. Other than connecting to an RF circuit 3364 of the RRH 3360 via the connection interface 3357, the BB processor 3356 is the same as the BB processor 3226 described with reference to FIG. 32. As show in FIG. 33, the wireless communication interface 3355 may include multiple BB processors 3356. For example, the multiple BB processors 3356 may be compatible with the multiple frequency bands used by the eNB 3330. Although FIG. 33 shows an example in which the wireless communication interface 3355 includes multiple BB processors 3356, the wireless communication interface 3355 may also include a single BB processor 3356.

The connection interface 3357 is an interface for connecting the base station device 3350 (the wireless communication interface 3355) to the RRH 3360. The connection interface 3357 may also be a communication module to connect the base station device 3350 (the wireless communication interface 3355) to the RRH 3360 for communication in the above high-speed line.

The RRH 3360 includes a connection interface 3361 and a wireless communication interface 3363.

The connection interface 3361 is an interface for connecting the RRH 3360 (the wireless communication interface 3363) to the base station device 3350. The connection interface 3361 may also be a communication module for the communication in the above high-speed line.

The wireless communication interface 3363 transmits and receives wireless signals via the antenna 3340. The wireless communication interface 3363 may typically include, for example, the RF circuit 3364. The RF circuit 3364 may include, for example, a frequency mixer, a filter and an amplifier, and transmits and receives wireless signals via the antenna 3340. The wireless communication interface 3363 may include multiple RF circuits 3364, as shown in FIG. 33. For example, the multiple RF circuits 3364 may support multiple antenna elements. Although FIG. 33 shows the example in which the wireless communication interface 3363 includes the multiple RF circuits 3364, the wireless communication interface 3363 may also include a single RF circuit 3364.

In the eNB 3200 shown in FIG. 32 and the eNB 3330 shown in FIG. 33, the determination unit 1720, the demodulation unit 1730 and the processing unit 1740 described with reference to FIG. 17 may be implemented by the controller 3231 and/or the controller 3351. At least a part of the functions may be implemented by the controller 3221 and the controller 3351. For example, the controller 3221 and/or the controller 3351 may execute the functions of determining whether to receive the HARQ feedback, demodulating the feedback message, and configuring the downlink control information carried by the PDCCH by executing instructions stored in the corresponding memory.

[Application Example of the Terminal Device]

First Application Example

Figure 34:
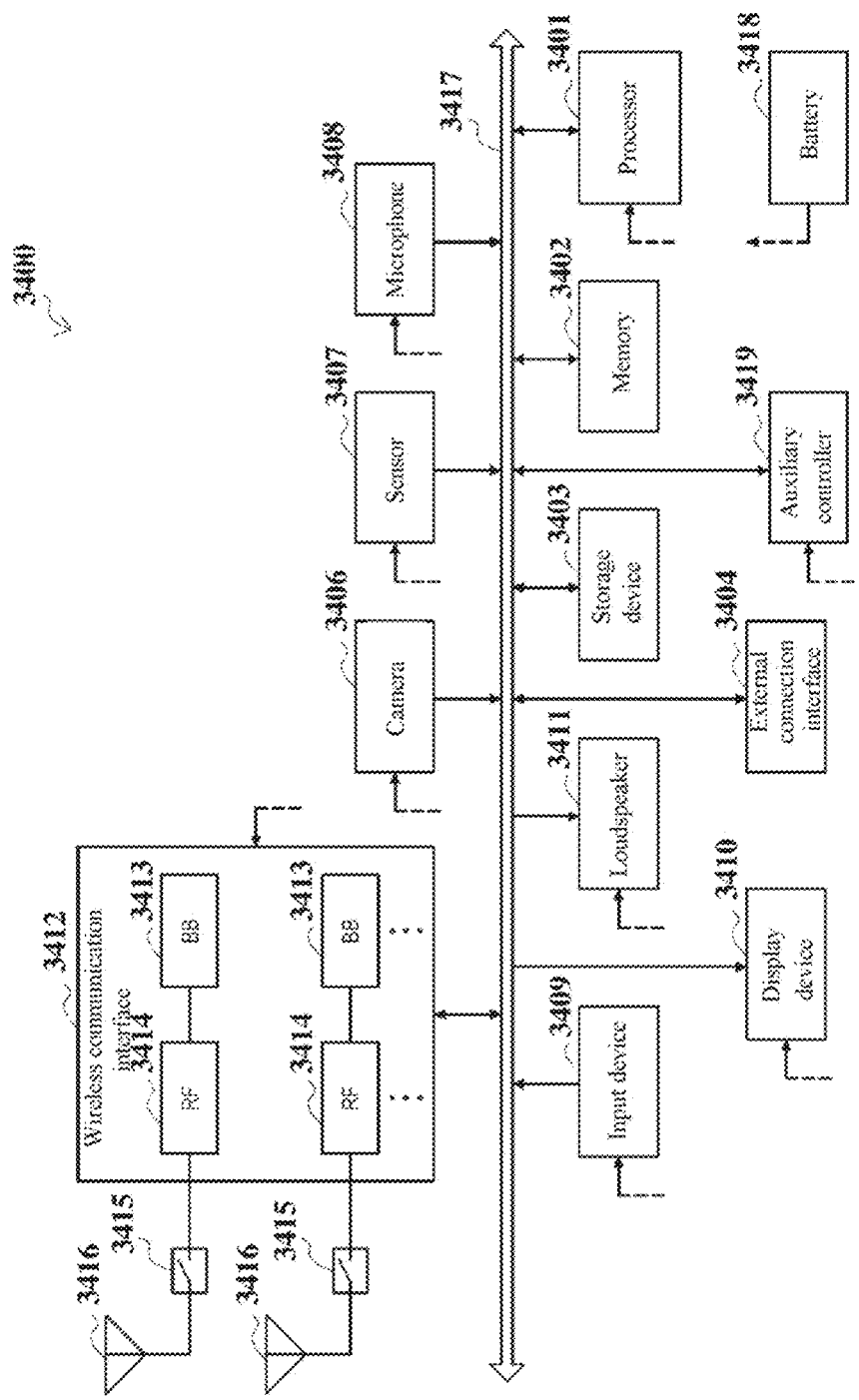
FIG. 34 is a block diagram showing an example of a schematic configuration of a smartphone.

FIG. 34 is a block diagram showing an example of a schematic configuration of a smartphone 3400 to which the technique of the present disclosure may be applied. The smart phone 3400 includes a processor 3401, a memory 3402, a storage device 3403, an external connection interface 3404, a camera 3406, a sensor 3407, a microphone 3408, an input device 3409, a display device 3410, a loudspeaker 3411, a wireless communication interface 3412, a single or multiple antenna switches 3415, a single or multiple antennas 3416, a bus 3417, a battery 3418 and an auxiliary controller 3419.

The processor 3401 may be, for example, a CPU or a system on chip (SoC), and control functions of an application layer and other layers of the smart phone 3400. The memory 3402 includes an RAM and an ROM, and stores programs executed by the processor 3401 and data. The storage device 3403 may include a storage medium such as a semiconductor memory and a hard disk. The external connection interface 3404 is an interface for connecting an external device (such as a memory card and a universal serial bus (USB) device) to the smart phone 3400.

The camera 3406 includes an image sensor (such as a charge coupled device (CCD) and a complementary metal oxide semiconductor (CMOS)) and generates a captured image. The sensor 3407 may include a group of sensors such as a measurement sensor, a gyro sensor, a geomagnetic sensor, and an acceleration sensor. The microphone 3408 converts sounds that are inputted to the smart phone 3400 into audio signals. The input device 3409 includes, for example, a touch sensor configured to detect touch onto a screen of the display device 3410, a keypad, a keyboard, a button, or a switch, and receive an operation or information inputted from a user. The display device 3410 includes a screen such as a liquid crystal display (LCD) and an organic light-emitting diode (OLED) display, and displays an output image of the smart phone 3400. The speaker 3411 converts the audio signal that is outputted from the smart phone 3400 to sound.

The wireless communication interface 3412 supports any cellular communication scheme (such as LTE and LTE-Advanced), and performs wireless communications. The wireless communication interface 3412 may typically include, for example, a BB processor 3413 and an RF circuit 3414. The BB processor 3413 may perform for example coding/decoding, modulation/demodulation and multiplexing/de-multiplexing, and perform various types of signal processes for wireless communications. The RF circuit 3414 may include, for example, a frequency mixer, a filter and an amplifier, and transmits and receives wireless signals via the antenna 3416. The wireless communication interface 3412 may be a chip module having the BB processor 3413 and the RF circuit 3414 integrated thereon. As shown in FIG. 34, the wireless communication interface 3412 may include multiple BB processors 3413 and multiple RF circuits 3414. Although FIG. 34 shows an example in which the wireless communication interface 3412 includes multiple BB processors 3413 and multiple RF circuits 3414, the wireless communication interface 3412 may also include a single BB processor 3413 and a single RF circuit 3414.

Furthermore, in addition to the cellular communication scheme, the wireless communication interface 3412 may support another type of wireless communication scheme such as a short-distance wireless communication scheme, a near field communication scheme, and a radio local area network (LAN) scheme. In this case, the wireless communication interface 3412 may include the BB processor 3413 and the RF circuit 3414 for each wireless communication scheme.

Each of the antenna switches 3415 switches connection destinations of the antennas 3416 among multiple circuits (such as circuits for different wireless communication schemes) included in the wireless communication interface 3412.

Each of the antennas 3416 includes a single or multiple antenna elements (such as the multiple antenna elements included in an MIMO antenna), and is used for the wireless communication interface 3412 to transmit and receive wireless signals. The smartphone 3400 may include the multiple antennas 3416, as shown in FIG. 34. Although FIG. 34 shows the example in which the smartphone 3400 includes the multiple antennas 3416, the smartphone 3400 may also include a single antenna 3416.

Furthermore, the smart phone 3400 may include the antenna 3416 for each wireless communication scheme. In this case, the antenna switch 3415 may be omitted from the configuration of the smart phone 3400.

The bus 3417 connects the processor 3401, the memory 3402, the storage device 3403, the external connection interface 3404, the camera 3406, the sensor 3407, the microphone 3408, the input device 3409, the display device 3410, the speaker 3411, the wireless communication interface 3412, and the auxiliary controller 3419 to each other. The battery 3418 supplies power to the various modules of the smartphone 3400 shown in FIG. 34 via a feeder line. The feeder line is partially shown with a dash line in FIG. 34. The auxiliary controller 3419 operates a minimum necessary function of the smart phone 3400, for example, in a sleep mode.

In the smartphone 3400 shown in FIG. 34, the demodulation unit 120, the determination unit 130, the feedback unit 140 and the buffer unit 150 described with reference to FIG. 1 may be implemented by the processor 3401 or the auxiliary controller 3419. At least a part of the functions may be implemented by the processor 3401 and the auxiliary controller 3419. For example, the processor 3401 and the auxiliary controller 3419 may execute the functions of demodulating the downlink signal, determining whether to perform the HARQ feedback, performing the HARQ feedback, and buffering downlink data by executing instructions stored in the memory 3402 or the storage device 3403.

Second Application Example

Figure 35:
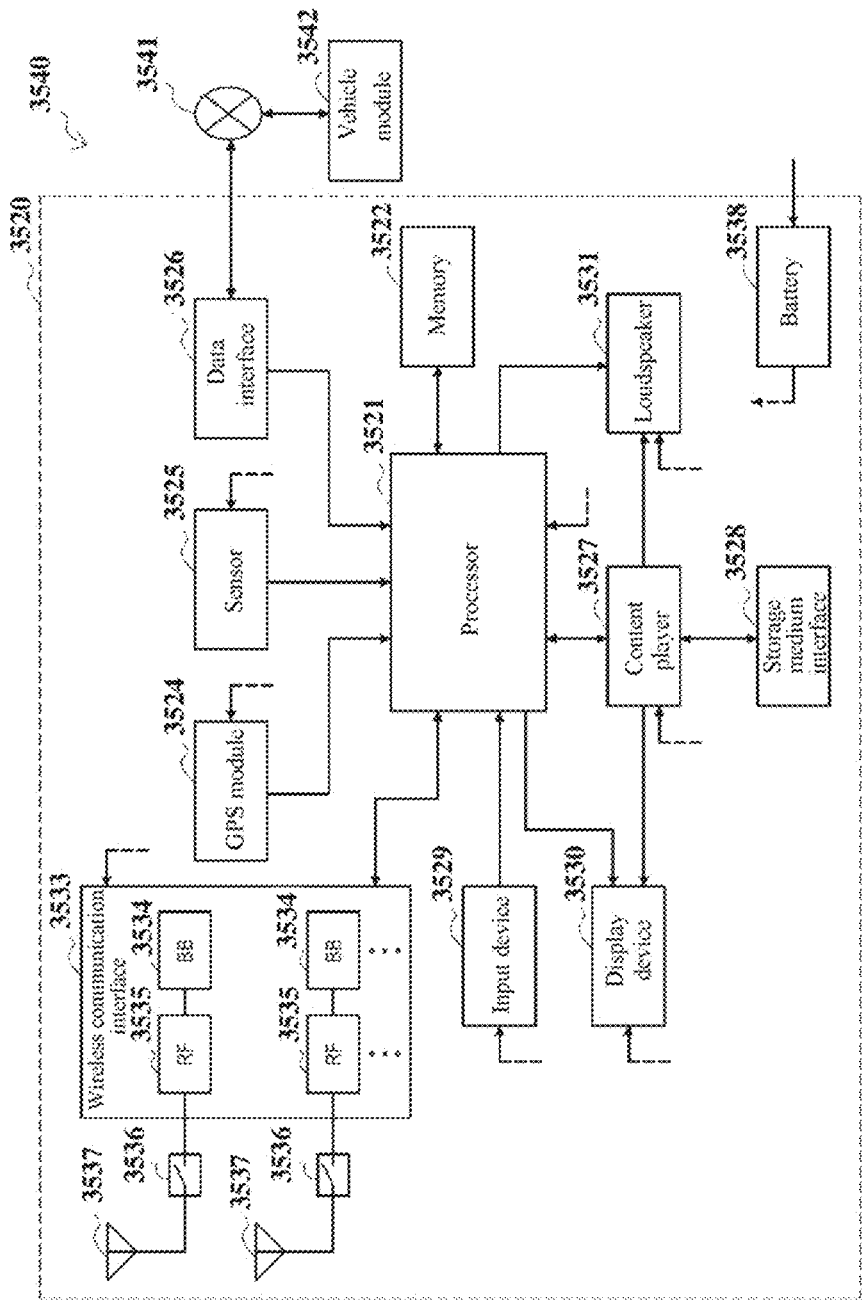
FIG. 35 is a block diagram showing an example of a schematic configuration of a car navigation device.

FIG. 35 is a block diagram showing an example of a schematic configuration of a vehicle navigation device 3520 to which the technique of the present disclosure may be applied. The car navigation device 3520 includes a processor 3521, a memory 3522, a global positioning system (GPS) module 3524, a sensor 3525, a data interface 3526, a content player 3527, a storage medium interface 3528, an input device 3529, a display device 3530, a speaker 3531, a wireless communication interface 3533, a single or multiple antenna switches 3536, a single or multiple antennas 3537 and a battery 3538.

The processor 3521 may be, for example, a CPU or SoC, and controls the navigation function and additional functions of the car navigation device 3520. The memory 3522 includes an RAM and an ROM, and stores programs executed by the processor 3521, and data.

The GPS module 3524 measures a location of the car navigation device 3520 (such as a latitude, a longitude and a height) using a GPS signal received from a GPS satellite. The sensor 3525 may include a group of sensors such as a gyroscope sensor, a geomagnetic sensor and an air pressure sensor. The data interface 3526 is connected to, for example, an in-vehicle network 3541 via a terminal that is not shown, and obtains data generated by the vehicle (such as vehicle speed data).

The content player 3527 reproduces content stored in a storage medium (such as a CD and a DVD) that is inserted into the storage medium interface 3528. The input device 3529 includes, for example, a touch sensor configured to detect touch onto a screen of the display device 3530, a button, or a switch, and receives an operation or information inputted from a user. The display device 3530 includes a screen such as a LCD or an OLED display, and displays an image for the navigation function or content that is reproduced. The speaker 3531 outputs sounds for the navigation function or the content that is reproduced.

The wireless communication interface 3533 supports any cellular communication scheme (such as LTE and LTE-advanced), and performs wireless communications. The wireless communication interface 3533 may typically include, for example, a BB processor 3534 and an RF circuit 3535. The BB processor 3534 may perform, for example, coding/decoding, modulating/demodulating and multiplexing/de-multiplexing, and perform various types of signal processes for wireless communications. The RF circuit 3535 may include, for example, a frequency mixer, a filter and an amplifier, and transmits and receives wireless signals via the antenna 3537. The wireless communication interface 3533 may also be a chip module having the BB processor 3534 and the RF circuit 3535 integrated thereon. As shown in FIG. 35, the wireless communication interface 3533 may include multiple BB processors 3534 and multiple RF circuits 3535. Although FIG. 35 shows the example in which the wireless communication interface 3533 includes the multiple BB processors 3534 and the multiple RF circuits 3535, the wireless communication interface 3533 may also include a single BB processor 3534 or a single RF circuit 3535.

Furthermore, in addition to a cellular communication scheme, the wireless communication interface 3533 may support another type of wireless communication scheme such as a short-distance wireless communication scheme, a near field communication scheme, and a wireless LAN scheme. In this case, the wireless communication interface 3533 may include the BB processor 3534 and the RF circuit 3535 for each wireless communication scheme.

Each of the antenna switches 3536 switches connection destinations of the antenna 3537 among multiple circuits (such as circuits for different wireless communication schemes) included in the wireless communication interface 3533.

Each of the antennas 3537 includes a single or multiple antenna elements (such as the multiple antenna elements included in a MIMO antenna) and is used for the wireless communication interface 3533 to transmit and receive wireless signals. The car navigation device 3520 may include multiple antennas 3537, as shown in FIG. 35. Although FIG. 35 shows the example in which the car navigation device 3520 includes the multiple antennas 3537, the car navigation device 3520 may also include a single antenna 3537.

Furthermore, the car navigation device 3520 may include the antenna 3537 for each wireless communication scheme. In this case, the antenna switch 3536 may be omitted from the configuration of the car navigation device 3520.

The battery 3538 supplies power to the various modules of the car navigation device 3520 shown in FIG. 35 via feeder lines that are partially shown as dashed lines in FIG. 35. The battery 3538 accumulates power supplied from the vehicle.

In the car navigation device 3520 shown in FIG. 35, the demodulation unit 120, the determination unit 130, the feedback unit 140 and the buffer unit 150 described with reference to FIG. 1 may be implemented by the processor 3521. At least a part of the functions may be implemented by the processor 3521. For example, the processor 3521 may execute the functions of demodulating the downlink signal, determining whether to perform the HARQ feedback, performing the HARQ feedback, and buffering downlink data by executing instructions stored in the memory 3522.

The technique of the disclosure may also be implemented as an in-vehicle system (or a vehicle) 3540 including one or more of the car navigation device 3520, an in-vehicle network 3541 and a vehicle module 3542. The vehicle module 3542 generates the vehicle data (such as a vehicle speed, a motor speed and fault information), and outputs the generated data to the in-vehicle network 3541.

The preferred embodiments of the present disclosure are described above with reference to the drawings, but the present disclosure is not limited to the above examples. Those skilled in the art may make various alternations and modifications within the scope of the claims, and it should be understood that these alternations and modifications should naturally fall within the technical scope of the present disclosure.

For example, units shown by dashed boxes in the functional block diagram shown in the drawings all indicate that the functional unit is optional in the corresponding device, and each optional functional unit may be combined in an appropriate manner to achieve a desired function.

For example, multiple functions included in one unit in the above embodiments may be implemented by separate devices. Alternatively, multiple functions implemented by multiple units in the above embodiments may be implemented by separate devices, respectively. In addition, one of the above functions may be implemented by multiple units. Further, such a configuration is included in the technical scope of the present disclosure.

In this specification, the steps described in the flowchart include not only processes performed in time series in the order described, but also processes performed in parallel or individually instead of having to be performed in time series. Further, even in the steps processed in a time series, the order can be appropriately changed.

Although the embodiments of the present disclosure have been described above in detail in connection with the drawings, it is appreciated that the embodiments as described above are merely illustrative but not limitative of the present disclosure. Those skilled in the art may make various modifications and variations to the above embodiments without departing from the spirit and scope of the disclosure. Therefore, the scope of the disclosure is defined merely by the appended claims and their equivalents.

The invention claimed is:

1. A user equipment, comprising processing circuitry configured to:

receive, from a network side device, first data information, second data information, first control information with respect to the first data information, and second control information with respect to the second data information, wherein the first data information comprises the second control information, and the second data information comprises the first control information; and decode information received from the network side device to obtain the first data information and the second data information.

2. The user equipment according to claim 1, wherein the processing circuitry is further configured to:

decode the first control information, and decode the first data information by using the decoded first control information.

3. The user equipment according to claim 2, wherein the processing circuitry is further configured to:

determine the second control information according to the decoded first data information; and decode the second data information by using the determined second control information.

4. The user equipment according to claim 1, wherein the first control information is first Downlink Control Information (DCI) carried by a first Physical Downlink Control Channel (PDCCH) and the second control information is second DCI carried by a second PDCCH.

5. The user equipment according to claim 4, wherein the processing circuitry is configured to receive, from the network side device, the first data information including the second PDCCH, through a first Physical Downlink Share Channel (PDSCH), and the second data information including the first PDCCH, through a second PDSCH.

6. The user equipment according to claim 1, wherein the processing circuitry is configured to demodulate a downlink signal from the network side device to obtain a PDCCH contained in the downlink signal; and wherein the processing circuitry is configured to determine, according to content of DCI carried by the PDCCH, whether to perform a Hybrid Automatic Repeat Request (HARD) feedback with respect to the DCI.

7. The user equipment according to claim 6, wherein the processing circuitry is further configured to:

in a case that the DCI comprises control information related to downlink transmission of the user equipment, perform the HARQ feedback with respect to the DCI; and in a case that the DCI comprises control information related to uplink transmission of the user equipment, not perform the HARQ feedback with respect to the DCI.

8. The user equipment according to claim 7, wherein the processing circuitry is further configured to:

in a case that the DCI is decoded correctly, transmit a ACK message with respect to the DCI to the network side device, and receive downlink data from the network side device according to the DCI; and in a case that the DCI is not decoded correctly, transmit a NACK message with respect to the DCI to the network side device, and receive retransmitted DCI from the network side device.

9. The user equipment according to claim 8, wherein the processing circuitry is further configured to:

simultaneously receive downlink data and the retransmitted DCI from the network side device by using different frequency domain resources.

10. The user equipment according to claim 8, wherein the processing circuitry is further configured to:
- before receiving the retransmitted DCI from the network side device, receive the downlink data from the network side device and buffer the downlink data.

11. The user equipment according to claim 10, wherein the processing circuitry is further configured to:
- receive the downlink data on a plurality of Bandwidth Parts BWPs of the user equipment which are configured in advance, and buffer the downlink data; or
- receive the downlink data on one or more Bandwidth Parts BWPs of the user equipment which are default, and buffer the downlink data.

12. The user equipment according to claim 6, wherein the processing circuit is further configured to:
- transmit a combined HARQ feedback message to the network side device, wherein the combined HARQ feedback message comprises a HARQ feedback message with respect to the DCI and a HARQ feedback message with respect to one or more other DCIs.

13. The user equipment according to claim 6, wherein the processing circuit is further configured to:
- transmit a combined HARQ feedback message to the network side device, wherein the combined HARQ feedback message comprises a HARQ feedback message with respect to the DCI and a HARQ feedback message with respect to downlink data carried by a PDSCH.

* * * * *